United States Patent [19]
Daggett et al.

[11] Patent Number: 4,902,944
[45] Date of Patent: Feb. 20, 1990

[54] DIGITAL ROBOT CONTROL HAVING AN IMPROVED CURRENT SENSING SYSTEM FOR POWER AMPLIFIERS IN A DIGITAL ROBOT CONTROL

[75] Inventors: Kenneth E. Daggett, Murrysville, Pa.; Eimei M. Onaga, Brookfield Center; Richard J. Casler, Jr., Newtown, both of Conn.; Richard A. Johnson, Murrysville; Leonard C. Vercellotti, Oakmont, both of Pa.

[73] Assignee: Staubli International AG., Switzerland

[21] Appl. No.: 180,719

[22] Filed: Apr. 4, 1988

Related U.S. Application Data

[63] Continuation of Ser. No. 932,975, Nov. 20, 1986, abandoned.

[51] Int. Cl.$^4$ ............................................. G05B 19/42
[52] U.S. Cl. ............................. 318/568.11; 318/567; 318/563; 318/632; 364/513; 901/19; 901/23
[58] Field of Search .................... 318/561–577, 318/625, 634, 138, 254, 272–293, 314, 341, 345 R, 345 B, 365 H, 439, 599; 364/513, 167.01, 478; 219/125.1; 901/19–24

[56] References Cited

U.S. PATENT DOCUMENTS

| | | | |
|---|---|---|---|
| 3,525,029 | 8/1970 | Joslyn et al. | 318/599 |
| 4,167,693 | 9/1979 | Liska et al. | 318/138 |
| 4,442,387 | 4/1984 | Lindbom | 364/513 X |
| 4,454,573 | 6/1984 | Petsch | 318/341 X |
| 4,475,160 | 10/1984 | Inaba | 364/513 |
| 4,520,296 | 5/1985 | Lepper et al. | 318/282 X |
| 4,523,134 | 6/1985 | Kinoshita et al. | 318/313 |
| 4,523,135 | 6/1985 | Kogawa | 318/615 |
| 4,531,081 | 7/1985 | Liesegang | 318/599 X |
| 4,535,276 | 8/1985 | Yokobori | 318/254 |
| 4,544,868 | 10/1985 | Murty | 318/254 |
| 4,581,565 | 4/1986 | Van Pelt et al. | 318/294 |
| 4,599,545 | 7/1986 | Moriki | 318/341 X |
| 4,631,458 | 12/1986 | Furuichi | 318/254 |
| 4,633,150 | 12/1986 | Inaji et al. | 318/254 |
| 4,651,067 | 3/1987 | Ito et al. | 318/254 |
| 4,656,402 | 4/1987 | Nishikawa | 318/341 |
| 4,682,089 | 7/1987 | Tamari | 318/568 |
| 4,707,780 | 11/1987 | Grose et al. | 318/632 |
| 4,718,078 | 1/1988 | Bleidorn et al. | 364/513 X |
| 4,772,830 | 9/1988 | Kobari et al. | 318/563 |
| 4,782,272 | 11/1988 | Buckley et al. | 318/599 |

*Primary Examiner*—William M. Shoop, Jr.
*Assistant Examiner*—Paul Ip
*Attorney, Agent, or Firm*—Mason, Kolehmainen, Rathburn & Wyss

[57] ABSTRACT

A digital control for a multiaxis robot includes position, velocity and torque controls that drive a motor voltage control loop. Pulse width modulated control signals operate power switches in a power bridge to control the current to each robot joint motor. A single resistor is connected in the bridge circuit to supply motor current feedback needed for control loop operation.

13 Claims, 21 Drawing Sheets

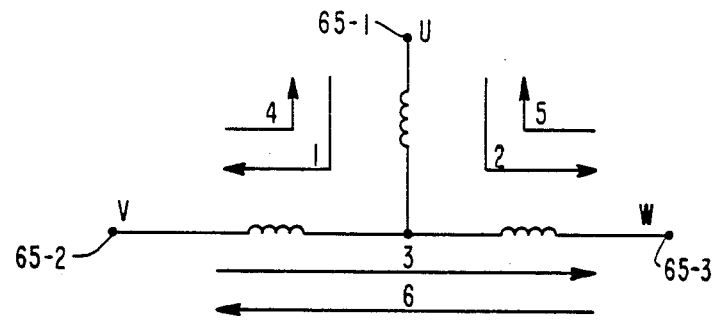
FIG. IIA
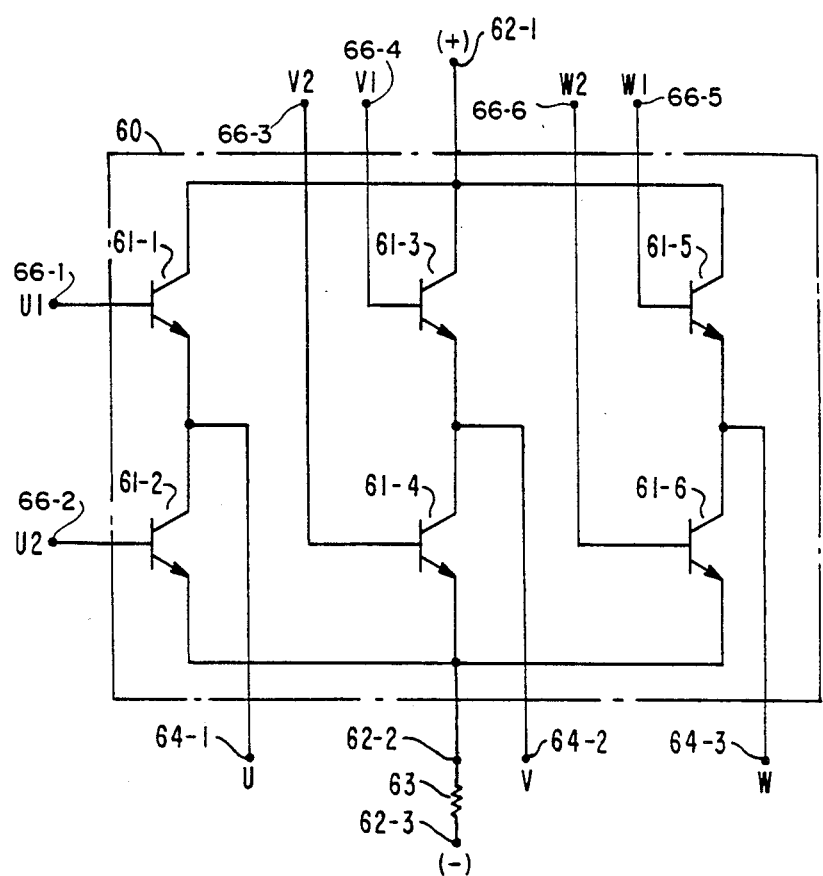
FIG. IIB

DIGITAL ROBOT CONTROL HAVING AN IMPROVED CURRENT SENSING SYSTEM FOR POWER AMPLIFIERS IN A DIGITAL ROBOT CONTROL

This application is a continuation, of application Ser. No. 06/932,975 filed November 20, 1986, now abandoned.

CROSS REFERENCE TO RELATED APPLICATIONS

The following concurrently filed patent applications, each filed on November 20, 1986, are related to the disclosure of the present application, assigned to the present assignee and are hereby incorporated by reference:

U.S. Ser. No. 932,841 (W.E. Case 53,225) now Continuation Ser. No. 231,627 filed August 5, 1988 (W.E. Case 53,225C) entitled DIGITAL ROBOT CONTROL HAVING AN IMPROVED PULSE WIDTH MODULATOR and filed by Kenneth E. Daggett.

U.S. Ser. No. 932,992 (W.E. Case 53,226) now Continuation Ser. No. 180,703 filed April 5, 1988 (W.E. Case 53,226C) entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 (W.E. Case 53,227) entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 (W.E. Case 53,367) now Continuation Ser. No. 178,813 filed April 1, 1988 (W.E. Case 53,367C) entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 (W.E. Case 53,368) now continuation Ser. No. 178,811 filed April 1, 1988 (W.E. Case 53,368C) entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 (W.E. Case 53,369) entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 (W.E. Case 53,372) entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 (W.E. Case 53,373) entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 (W.E. Case 53,374) entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977, now Continuation Ser. No. 180,601 filed April 6, 1988 (W.E. Case 53,423C) entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 (W.E. Case 53,424) now Continuation Ser. No. 180,723 filed April 4, 1988 (W.E. Case 53,424C) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Pat. No. 4,829,219 (W.E. Case 53,489) entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 (W.E. Case 53,490) entitled MULTIAXIS ROBOT CONTROL HAVING CAPABILITY FOR EXECUTING TIMED MOVES and filed by Rajan Penkar.

U.S. Pat. No. 4,772,831 (W.E. Case 53,491) entitled MULTIAXIS ROBOT CONTROL HAVING IMPROVED CONTINUOUS PATH OPERATION and filed by Rajan Penkar.

U.S. Pat. No. 4,773,025 (W.E. Case 53,492) entitled MULTIAXIS ROBOT CONTROL HAVING FITTED CURVED PATH CONTROL and filed by Rajan Penkar.

U.S. Ser. No. 932,973 (W.E. Case 53,493) now Continuation Ser. No. 180,598 filed April 6, 1988 (W.E. Case 53,493C) entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 (W.E. Case 53,494) entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to current sensing systems for robot arm power amplifiers used to energize the robot joint motors.

Power amplifiers are employed in robot arm control systems to supply the motor current needed to operate the axis drives and move the arm in accordance with a robot control program. Power amplifiers have been significant cost elements in the overall cost of robot control systems and it is thus important that power amplifiers be selected or designed to achieve quality performance with low cost.

Typically, power amplifier blocks have included internal circuitry that provides motor current control through on/off switching of switching devices within the power block. While this approach has been needed to coordinate power amplifiers with the position or position/velocity control loop configurations employed in controllers for numerical machine tools and robot arms, it has also made power amplifiers costly and has highly limited the external controllability of the internal power amplifier switching devices.

Nonetheless, the present and foreseeable volume of robot control systems does not justify the development of more suitable internally controlled power amplifier packages by any single manufacturer. To achieve desired performance in the field of robot control, it is thus necessary to look to the use of less costly commercially available power devices.

Hybrid power devices or blocks have recently been developed as low cost devices for high-volume nonservoed applications. The hybrid power blocks include power semiconductor and clamp diodes in multiple legs of a power amplifier bridge in a single package suitable for direct mounting on a heat sink. No control circuitry is included in the hybrid power block, and the blocks thus are characterized with control flexibility as well as low cost.

Power amplifiers for high power robotic drives typically employ pulse width modulation control schemes. The power switch elements are usually configured in an H bridge where brush type DC joint motors are used.

A new and improved digital robot control system described in the cross-referenced patent applications advances the state of the robot control art through a completely digital implementation of robot position, velocity and current control loops. In achieving completely digital control, an improved PWM control scheme described fully in patent application W.E. 53,225 enables use of the low cost hybrid power blocks.

The new robot control system provides control over the torque developed by each of the axis drive motors. Since the torque developed by a motor is proportional to the current flowing through its windings, such an advanced robot control system requires measurement of the actual currents flowing through the axis motors to provide time stabilized current sampling synchronized to the sampling frequency of position and velocity control loops in the robot control system.

Normally, current sensing could be accomplished through insertion of a current sense resistor in series with each leg of the power amplifier bridge. The voltages across the sense resistors would provide a measure of the axis motor current. However, insertion of a series resistor in each bridge leg is not feasible since the noted commercially available hybrid power blocks only have external leads which operate as common voltage and return or power supply rail leads. Moreover, analysis indicates that, even if such a leg resistor arrangement is employed with the low cost hybrid power block, circulating currents can flow through the motor without flowing through the power supply leads thereby making the accuracy of sensed current values uncertain.

The present invention is directed to a current sensing system which provides for sensing motor current while making use of the low cost hybrid power blocks for a robot control especially for a digital robot control.

SUMMARY OF THE INVENTION

A system is provided for energizing a robot arm joint motor and for sensing motor current for feedback control. It includes a power amplifier having a bridge circuit with a plurality of legs each having one end thereof connected to supply drive current to the motor from a power supply connected across the bridge circuit to the other ends of the legs. A semiconductor switch having a control terminal is connected in each bridge leg to make that leg conductive when a control signal is applied to the switch control terminal. Digital control means is operated cyclically to generate switch control signals that are pulse width modulated to operate the power switches and produce motor drive current having direction and magnitude required by cyclically generated robot drive control commands.

The digital control means generates the switch control signals to make each motor supply path through the bridge circuit conductive over at least a short portion of each control cycle to enable the direction of the sample current through the motor to be detected.

Means are provided for cyclically sampling the current from the power supply to the bridge circuit at a predetermined time during conduction in each motor supply path in synchronism with the control means cycle and within the short cycle portion. The sampling means further couples signals representing the current samples to the digital control means to provide feedback control over the generation of the robot drive control commands.

BRIEF DESCRIPTION OF THE DRAWINGS

FIGS. 11A and 11B shows a circuit diagram for another embodiment in which the power amplifier has a three phase configuration for use in operating brushless DC motors;

DESCRIPTION OF THE PREFERRED EMBODIMENT ROBOTS - GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
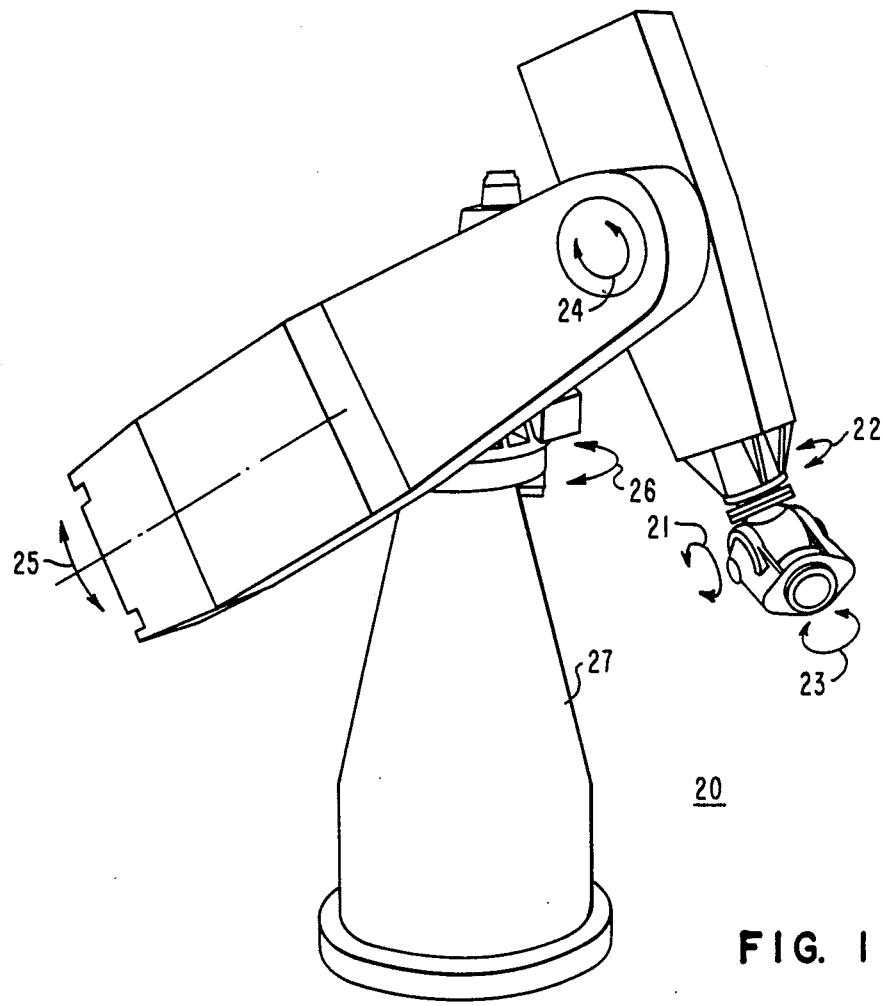
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly owned subsidary of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robot to service multiple machines and work surfaces.

Each axis motion is generated by a brush type DC electric motor, with axis position feedback generated by incremental encoders. As shown, the robot wrist is provided with three articulations, i.e., and up/down rotation indicated by arrow 21, a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

Figure 2A:
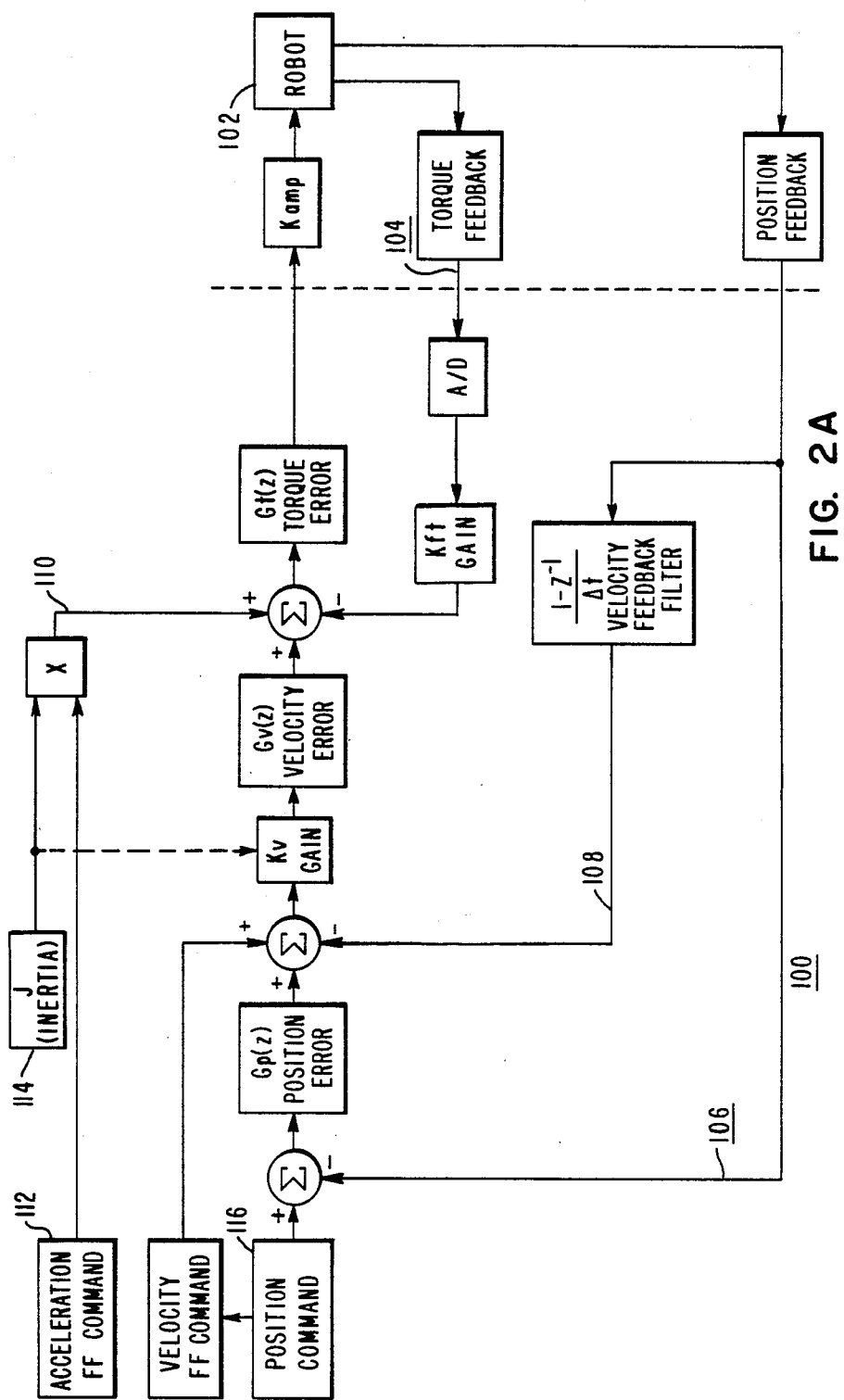
FIG. 2A shows a generalized block diagram of a control loop arrangement employing position, velocity and torque control loops in which the invention may be embodied.
Figure 2B:
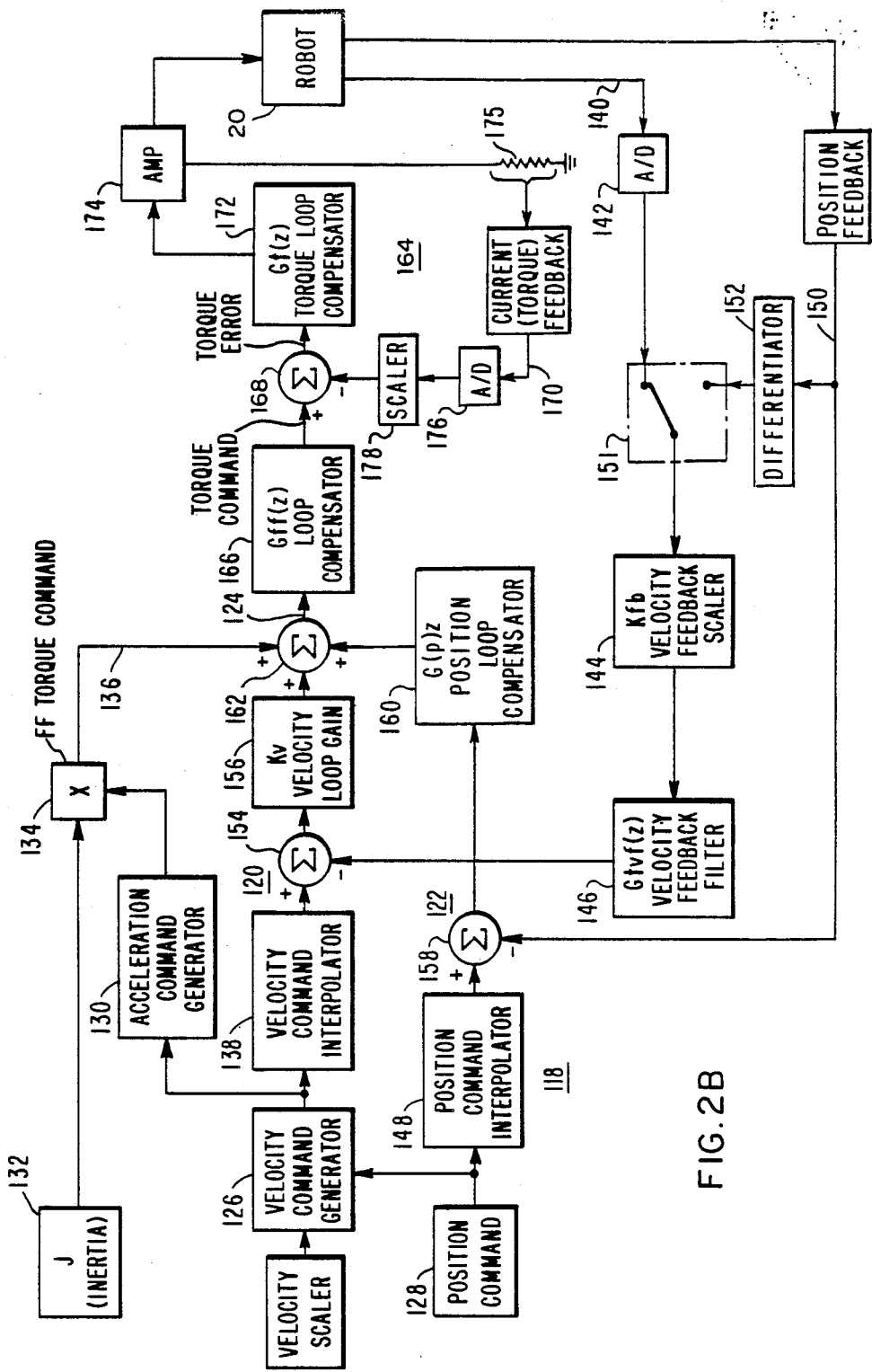
FIG. 2B shows a more detailed block diagram of a control loop arrangement employing position, velocity and torque control loops in which the invention preferably is embodied.

The present invention is directed to a robot control 30 (FIGS. 2A, 2B or 3A) which can operate the robot 20 of FIG. 1 and other robots including the larger unimation 860 robot which employs brushless DC axis motors and absolute position feedback. Generally, however, the robot control 30 is universally and flexibly applicable to differing kinds and sizes of robots in stand alone or robotic network operation. The robot control 30 is identified by the acronym UNIVAL and operates with completely digital servo control to provide better robot performance with lower cost.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of UNIVAL lies in modularization and in minimizing the use of arm dependent hardware and avoiding the use of any arm dependent hardware in as much of the modular control structure as possible.

CONTROL LOOPS

In FIG. 2, there is shown an embodiment of a generalized control loop configuration 100 employable in the robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

FIG. 3 shows the preferred generalized control loop configuration 118 presently employed in the robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position and velocity control loops 120 and 122 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications W.E. 53,325 and W.E. 53,368.

Velocity error is generated by summer 154 with gain applied by loop 156. Similarly, position error is generated by summer 158 with gain applied by box 160.

Velocity and position errors and feedforward acceleration command are summed in summer 162. Gain is applied to box 166 in generate a torque command which is applied to the input of torque control loop 164 every 1 millisecond. Torque error is generated in summer 168 by summing the torque command (motor current command) with current feedback from feedback path 170. Box 172 applies a torque loop gain to the torque error to get (motor voltage commands) and pulse width modulated (PWM) signals output are applied to a power amplifier 174 which supplies the motor drive current for robot joint operation. Current feedback from resistor 175 is sampled every 250 microseconds and converted to digital signals by box 176 with scaling applied by box 178.

BOARD OVERVIEW

Figure 3A:
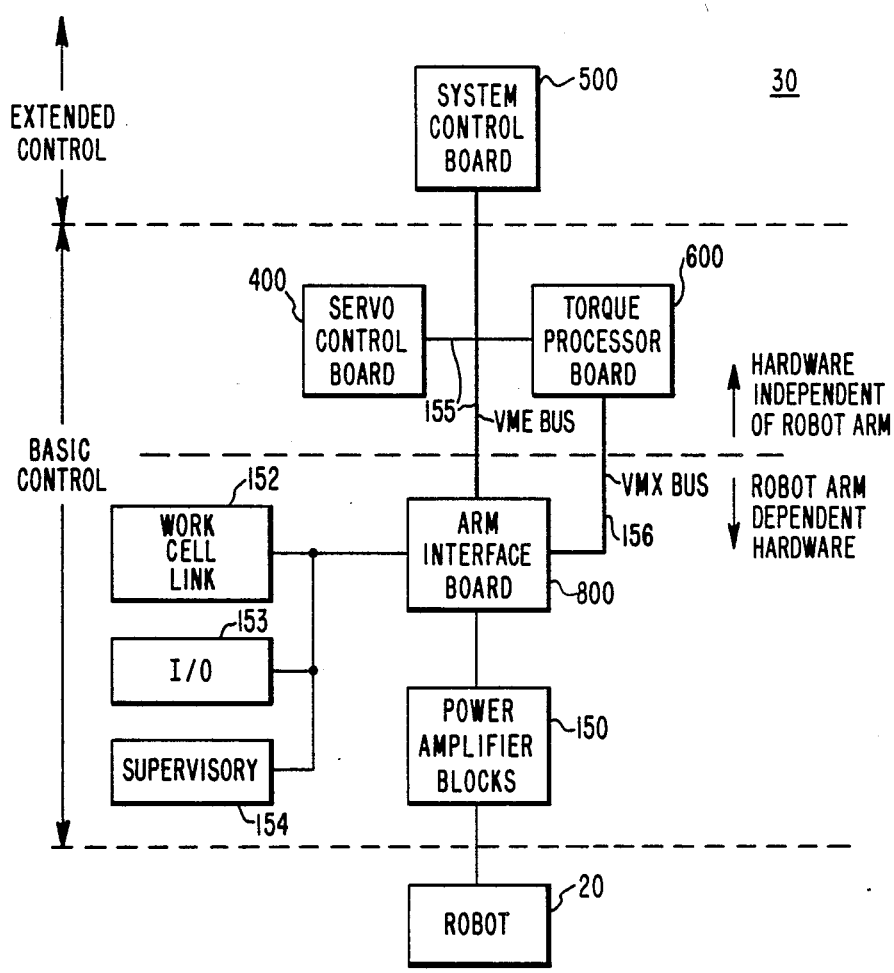
FIG. 3A shows an overview of an arrangement of an arm interface (AIF) board and other electronic boards on which digital robot control circuitry is provided to implement the present invention.

Implementation of the control looping for the robot control in FIG. 3A is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facility and universality of use, and flexibility in choice of level of control performance.

As shown in FIG. 3A, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board also houses generic circuitry such as VME bus control circuitry which is generally related to two or more boards and not to any one board in particular.

Control signals (pulse width modulated) are generated from the AIF board 800 to control amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL TM robot control can operate the robot 20 with significantly faster control action, i.e., with a trajectory cycle shortened from thirty-two microseconds to eight microseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

PULSE WIDTH MODULATION SCHEME GENERAL OVERVIEW

The pulse width modulation circuitry provides a digital interface for closing the torque or current control loop through the axis motor drive circuitry. The pulse width modulation concept is applied to control the conduction time width for the joint motor power switches and thereby satisfy motor voltage and torque and other higher level commands.

Figure 3B:
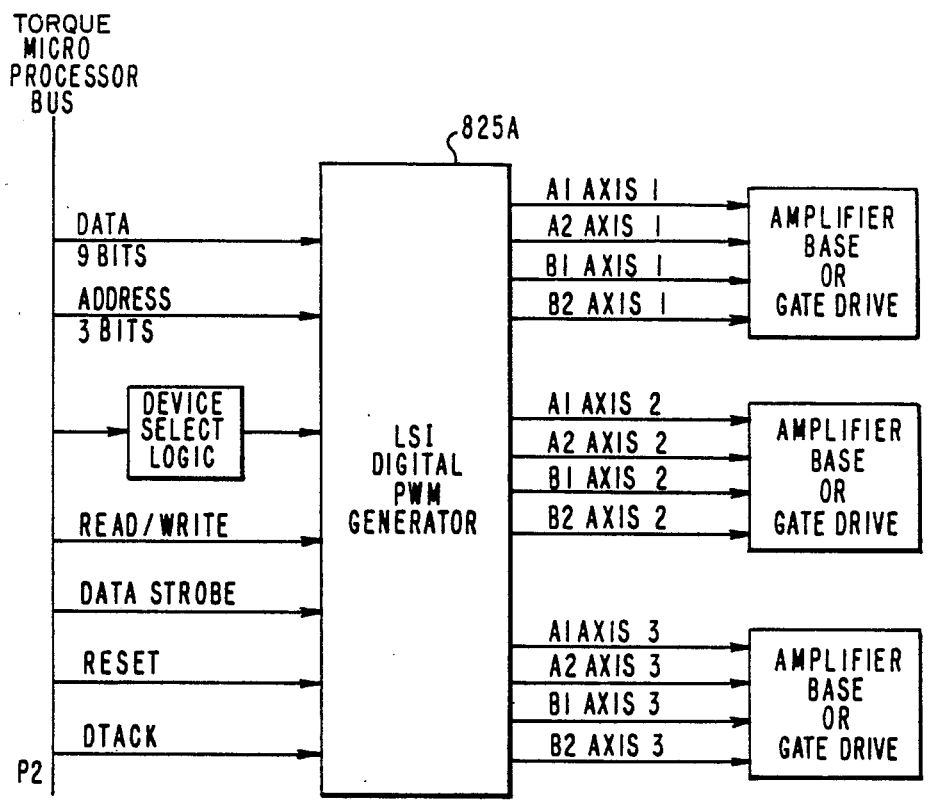
FIG. 3B shows a block diagram of a pulse width modulator (PWM) which produces control signals for a power amplifier operated in accordance with the principles of the invention.

As shown in the generalized block diagram of FIG. 3B, a digital PWM generator 825A receives 9 bit data commands and 3 register address bits on the torque microprocessor P2 bus (such as Bi-Polar or MOSFET semiconductor). Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type.

Figure 11C:
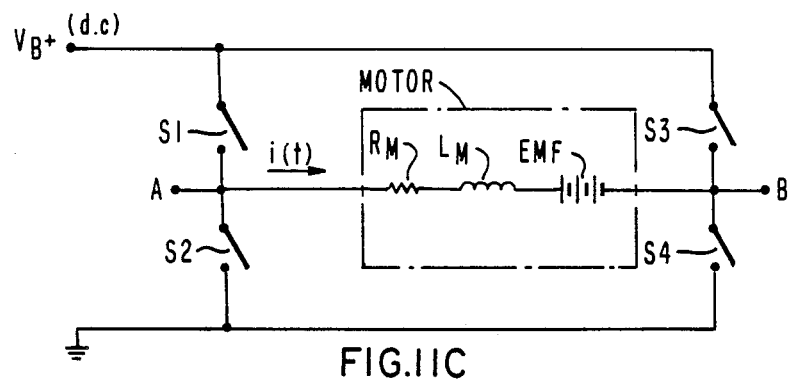
FIGS. 11C and 11D provide illustrations employed in proving the sampled motor current equals average motor current.

Four digital PWM control signals are employed to control the direction and magnitude of current flow through the motor windings through on/off power switch control. In the brushless DC motor embodiment, the three phase windings of the brushless DC motor are interconnected in a bridge circuit (FIGS. 11A and 11B)

such that the motor drive current is always directed through a pair of windings and the motor conduction path is rotated or commutated through successive winding pairs to produce the motor drive torque. In this arrangement, the PWM pulses determine the time span of motor current flow and commutation switching logic based on the PWM pulses and Hall effect sensor feedback signals determine the winding pairs through which, and the direction in which, drive current is to flow.

In the DC brush type embodiment where an H type power amplifier bridge circuit is employed, DC brush type motor 54 (FIG. 5) is operated in one direction when power amplifier switches (such as Bi-Polar or MOSFET semiconductor) 51-A1 and 51-B2 are opened under control of PWM output signals A1 and B2, when converted to driver signals 56-A1 and 56-B2, and it is operated in the opposite direction when power amplifier switches 51-B1 and 51-A2 are opened under control of PWM output signals B1 and A2.

The three address signals generally are encoded to address eight registers within the PWM generator of FIG. 3B. Two registers are used to store voltage commands for each axis. A total of six registers are thus used to store voltage commands, and the remaining two registers store command and status data common to the three axes.

Generally, the PWM chip operates as a microprocessor peripheral device (i.e., under the control of a microprocessor higher in the control loop configuration) to provide digital pulse width modulated signal generation for control of three axes having DC brush type motor drives. Among the embodiments, the PWM chip can be used with additional processing circuitry to provide PWM signal generation for three axes having DC brushless type motor drives.

Figure 4:
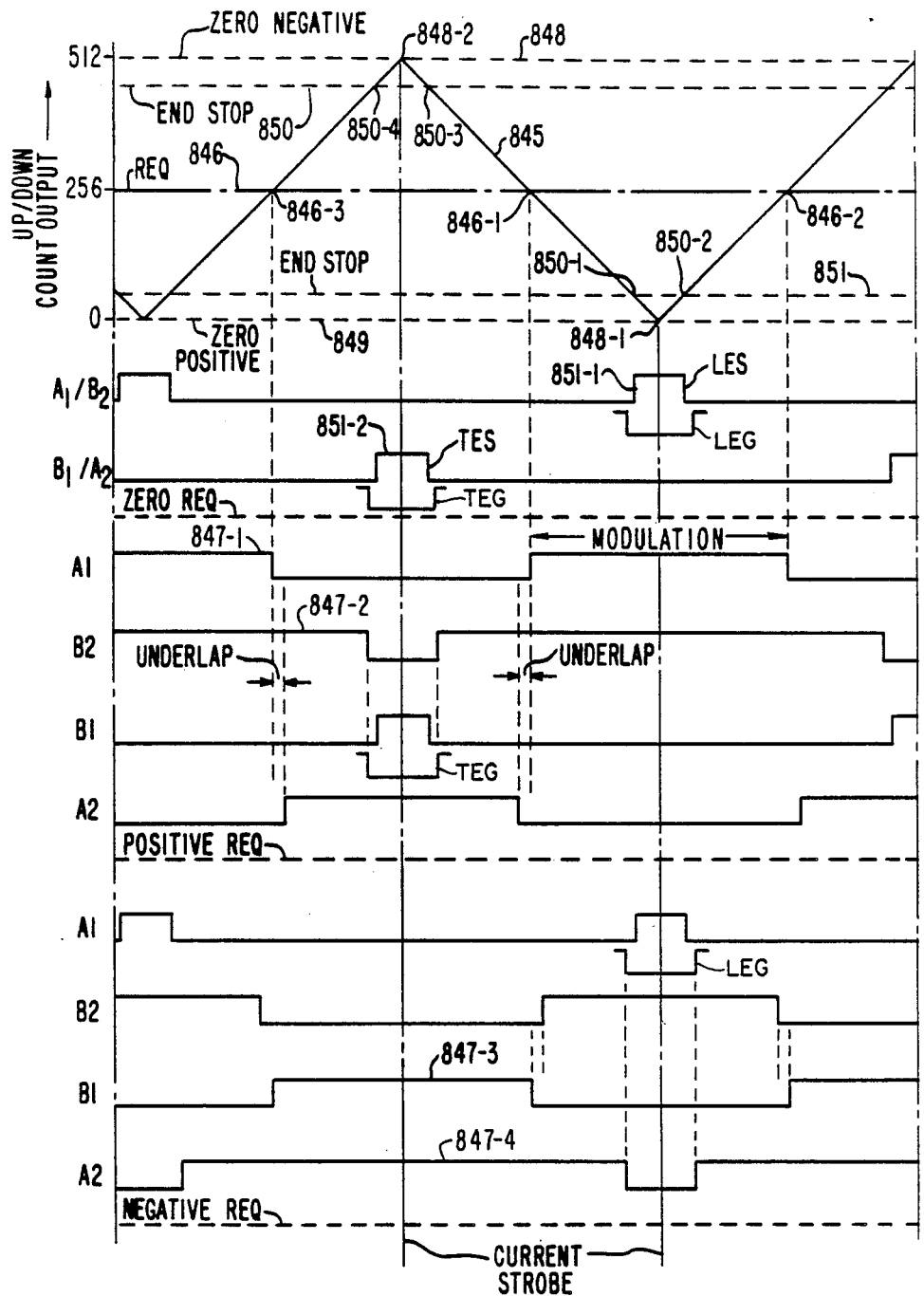
FIG. 4 shows a graph which shows control signals generated by the PWM for the power amplifier.

The modulation system used to generate digital switching signals which satisfy axis voltage commands is illustrated in FIG. 4. The up/down counting output of a PWM ramp counter (not shown) is represented by a saw tooth wave 845 with a top rail 848 (dashed) corresponding to a zero negative motor voltage command with increasing negative voltage commands corresponding to decreasing ordinate values. Bottom rail 849 dashed similarly corresponds to a zero positive motor voltage command with increasing positive voltage commands corresponding to increasing ordinate values. The output control pulses A1, A2, B1, B2 are used to control either the DC brush H bridge type power amplifier of FIG. 5 or, with additional processing circuitry, the DC brushless power amplifier of FIG. 11A and 11B. In explaining the operation of the PWM wave the DC brush type embodiment of FIG. 5 will be referenced.

Generally, the width of an output control pulse is logically determined by scaling the voltage request or command (horizontal line 846 corresponding to a counter count of 256) along the ordinate for the counter sawtooth waveform 845 according to the magnitude of the voltage command. In illustrative Case No. 1, positive voltage commands are scaled upward from end point 848-1 and intersect points 846-1 and 846-2 define the width of the resultant A1 control pulse 847-1 needed to execute the commanded positive motor voltage (with B2 enabling pulse 847.2; on as shown). With A1 and B2 on, current flows through the motor in the positive direction to the right in FIG. 5.

In illustrative Case No. 2, negative voltage commands are scaled downward from end point 848-2 and intersect points 846-3 and 846-1 define the width of the resultant B1 control pulse 847-3 needed to execute the commanded negative motor voltage (with A2 enabling pulse, 847.4; on as shown). With B1 and A2 on, reverse motor current flows through the motor to the left in FIG. 5.

Figure 5:
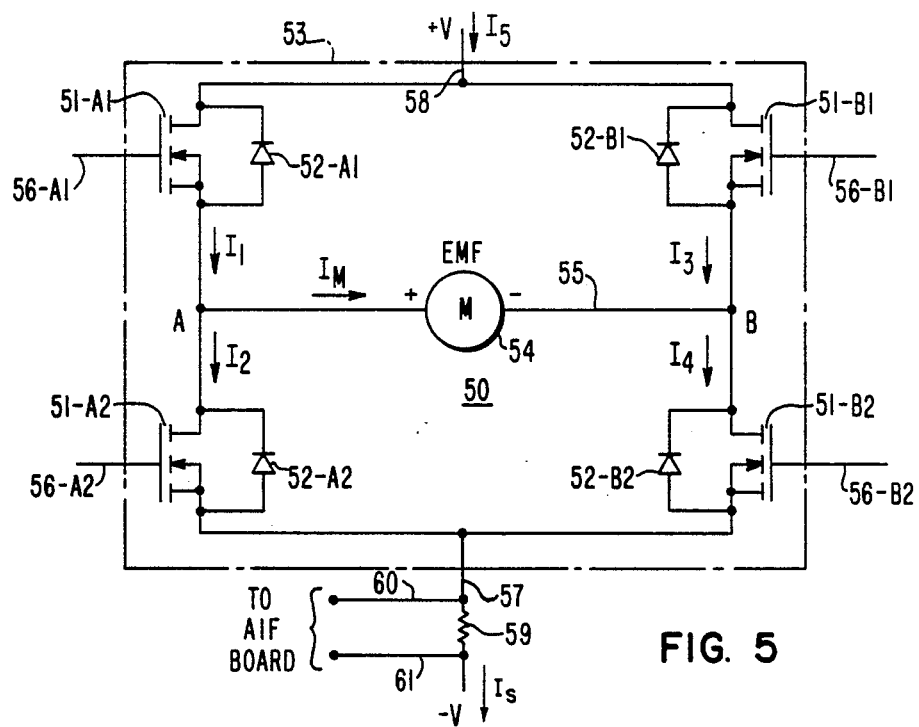
FIG. 5 shows a hybrid type, H bridge power amplifier arranged in accordance with the invention to operate DC brush type motors and sense robot joint motor current for feedback control.

For a zero voltage command, forced negative and positive end stop control voltages represented by dotted lines 850 and 851 produce an effective motor voltage of zero but provide assurance that current is always flowing through the motor rotor to enable rotor current sensing, i.e. magnitude and polarity sensing, for feedback control with the use of a single power amplifier sense resistor 63 in the brushless DC motor embodiment (see FIGS. 11A–11B) or the DC brush type motor embodiment with resistor 59 (see FIG. 5).

While current samples can be obtained to provide current amplitude and direction knowledge for each leg of a bridge by using sense circuitry within a power block, for example by using a resistor and associated transmitting circuitry in each bridge leg, the power block cost is then significantly greater since relatively complex circuitry is required. Further, the resolution of some current sensing problems may be extremely difficult at best and practically irresolvable at worst.

With the use of a single sense resistor 63 or 59, it becomes important to determine whether the direction and amplitude of motor current will be known under all operating conditions. For example, in the H-type bridge, the motor current can flow in either the forward or reverse direction through the motor while flowing in the same direction through the current sense resistor irrespective of drive polarity As another example, there are various conditions under which regenerative currents flow through the motor but not through the current sense resistor unless provisions are made in the current sense system to account for the regenerative currents. Thus, if a positive voltage motor command is abruptly dropped to zero, the stored inductive energy in the motor will produce a regenerative current that circulates in a diode loop through the power switch/diode circuitry within the power pack, without passing to the power supply through the current sense resistor, and it will go undetected unless provision is made to assure its detection.

With the use of current steering end stop pulses, TES, TEG and LES, LEG, respectively, power switches are always turned on at the ends of each PWM cycle to force any regenerative motor current to flow through the power supply and the current sense resistor thereby enabling motor current detection even if the motor voltage command is then zero. While each end stop pulse exists for a short period of time, it produces a small motor current that persists until the next end stop pulse or control pulse. Similarly, the next end stop pulse produces a small but reverse motor current that persists until the next cycle starts. Thus, a small motor ripple current results from successive end stop pulses in the absence of control pulses, but the average value of the ripple current is zero so that it has essentially no effect on the current, position and velocity control of the motor.

Current samples are taken once each PWM cycle so that current feedback signals are made available synchronously with control loop operation. Preferably, current samples are obtained at the midpoint of a preselected one of the two end stop pulses in each PWM cycle so that the sample value is the average motor current value for the PWM cycle during which the sample is taken.

Thus, from a basic control standpoint, there is no need for current samples to be obtained more frequently than once each PWM cycle and for this reason it is preferred that the current sampling frequency rate be equal to the PWM cycle frequency. However, the current sampling rate may occur at a lower rate than the PWM cycle frequency but in this event it must be synchronous with the PWM cycle for accurate control action.

As an alternative, the current sampling rate could be set at twice the PWM cycle frequency, i.e. a current sample at each end stop pulse, and the purpose of this arrangement could be to enable a control system equipped with suitable logic to select for control use in each PWM cycle the best of the two current samples in that PWM cycle. For example, under certain operating conditions, noise may make a sample at one end stop less accurate than a sample at the other end stop in a PWM cycle and software logic could be employed to select one (the best) of the two samples.

Circuitry associated with the up/down counter 844 senses the cycle count to initiate power amplifier switching in both the positive end region and the negative end region of the sawtooth counter waveform thereby producing forced motor current at both ends of the counter waveform even if the received motor voltage command is zero (i.e., near and at the maximum positive count and the maximum negative count).

As shown in FIG. 4, intersect points 850-1 and 850-2 define the width LES of the positive A1 end stop control pulse 851-1. Similarly, intersect points 850-3 and 850-4 define the width TES of the negative B1 end stop control pulse 851-2.

H BRIDGE POWER AMPLIFIER

In a first invention embodiment, an H bridge power amplifier or block 50 of the low cost hybrid type is shown in FIG. 5, and one of the power blocks 50 is employed to provide motor drive current for each DC brush type robot arm joint motors.

The power block 50 includes four semiconductor switches 51-A1, 51-A2, 51-B1 and 51-B2. Respective protective back voltage diodes 52-A1, 52-A2 and 52-B1, 52-B2 are connected across the respective semiconductor switches to permit the flow of freewheeling currents when the switches 51-B1, 51-B2 and 56-B1 are turned off.

The switches and diodes are packaged within a block indicated by dotted line 53. As previously indicated, no internal control circuitry is included in the hybrid type power block thereby enabling flexible configuration of external controls.

A robot joint DC brush type motor 54 (representative of any of the joint motors included in the Unimation 700 series robot arm of FIG. 1) is connected in a crosspath 55 of the H bridge circuit. When switches 51-A1 and 51-B2 are turned on, a positive voltage is applied across the motor 54 and current flows to the right in the crosspath 55 to drive the motor in the forward direction. With switches 51-B1 and 51-A2 turned on, current flows through the crosspath 55 in the opposite direction to drive the motor in the reverse direction. The digital pulses A1 and B1 of FIG. 4 precisely control the on time of the switches 51-A1 and 51-B2 respectively so as to produce the motor current needed to satisfy control commands. The pulses A2 and B2 control the on time of the switches 51-A2 and 51-B2 so that the B2 and A2 on times respectively overlap the A1 and B1 on times (thereby providing closed paths for motor drive current during A1, B1 on time and circulating paths for motor freewheeling currents during A1, B1 off times) and so that the A1 and A2 switches are not on at the same time and the B1 and B2 switches are not on at the same time (to avoid shorting the power supply).

The digital pulse pairs A1, B2 and B1, A2 determine the switch on time for forward motor drive current and reverse motor drive current respectively. In turn, the switch on time determines the motor energization level, i.e., the motor torque.

Switch base leads 56-A1, 56-A2 and 56-B1, 56-B2 extend from the switches to the outside of the block 53 where switch drive signals A1, A2, B1 and B2 are coupled from the pulse width modulator. Power supply voltage V is connected across external supply leads 57 and 58 to provide the motor drive current. An external current sensing resistor 59 is connected in series between the lead 57 and the power supply. Conductors 60 and 61 are connected from the two resistor terminals to apply the voltage drop across the current sensing resistor to the current feedback circuitry on the AIF board where it is processed for use in the current or torque control loop.

MOTOR DRIVE CURRENT FEEDBACK - TORQUE CONTROL

Figure 12A:
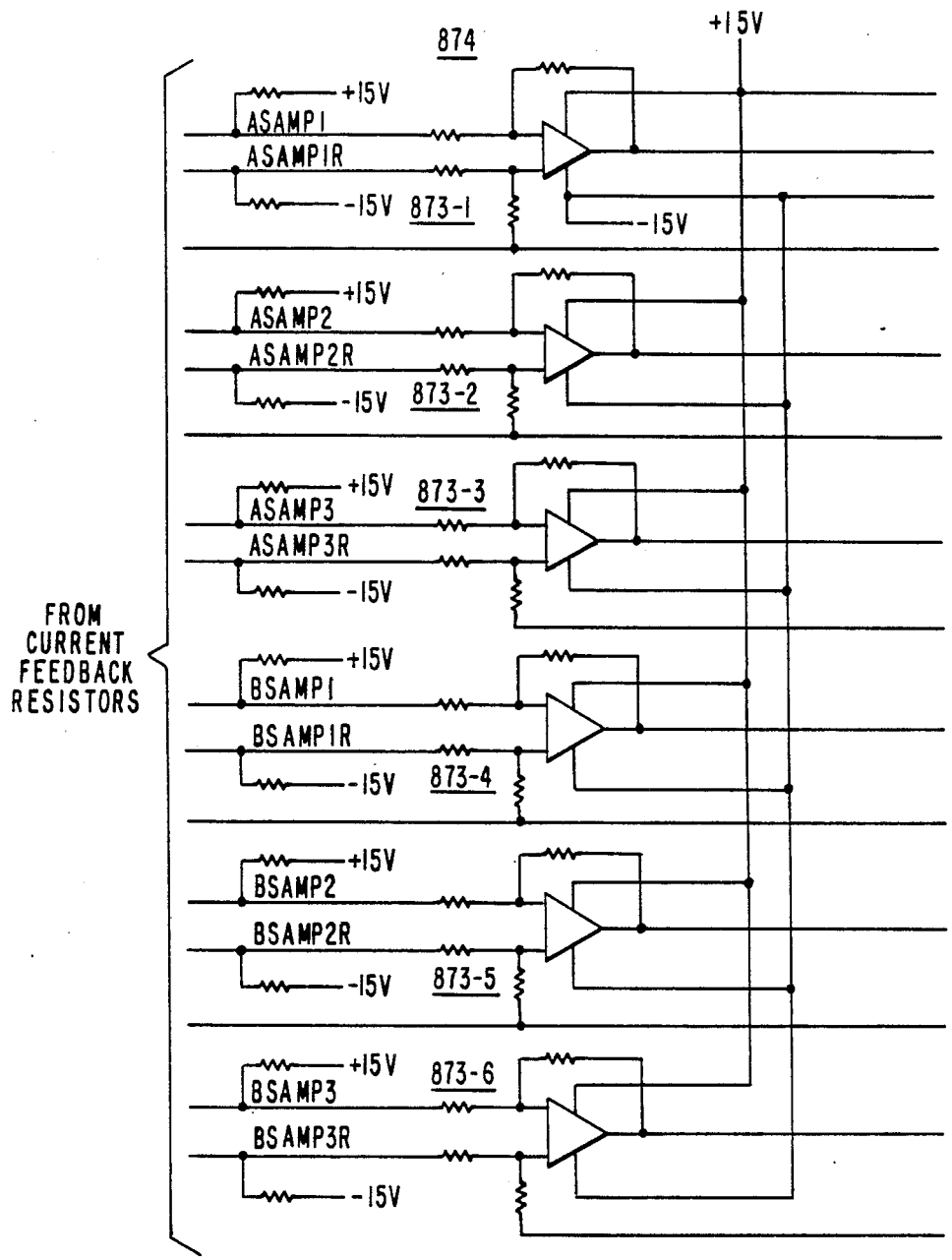
FIGS. 12A-12C show circuitry employed on an arm interface board for processing feedback current signals.
Figure 12B:
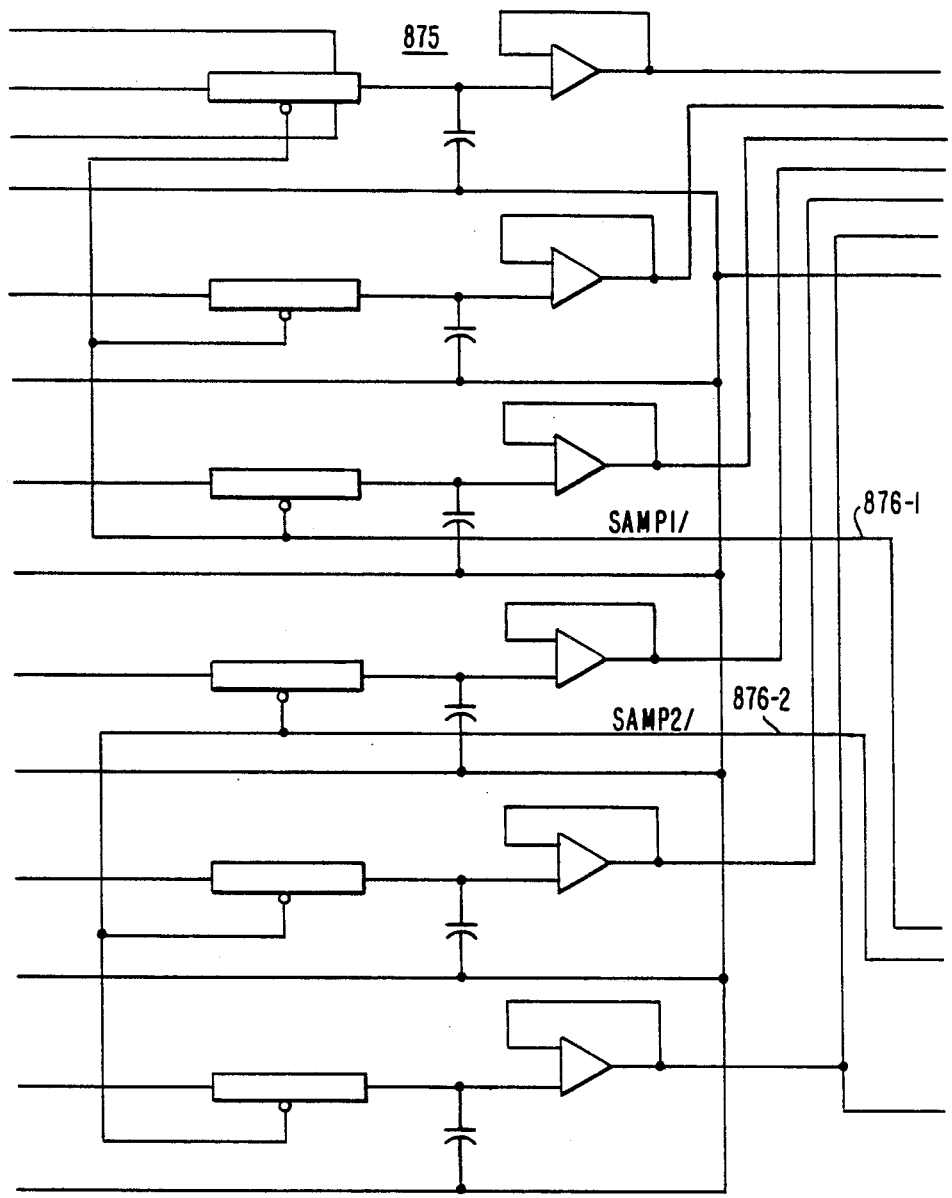
Figure 12C:
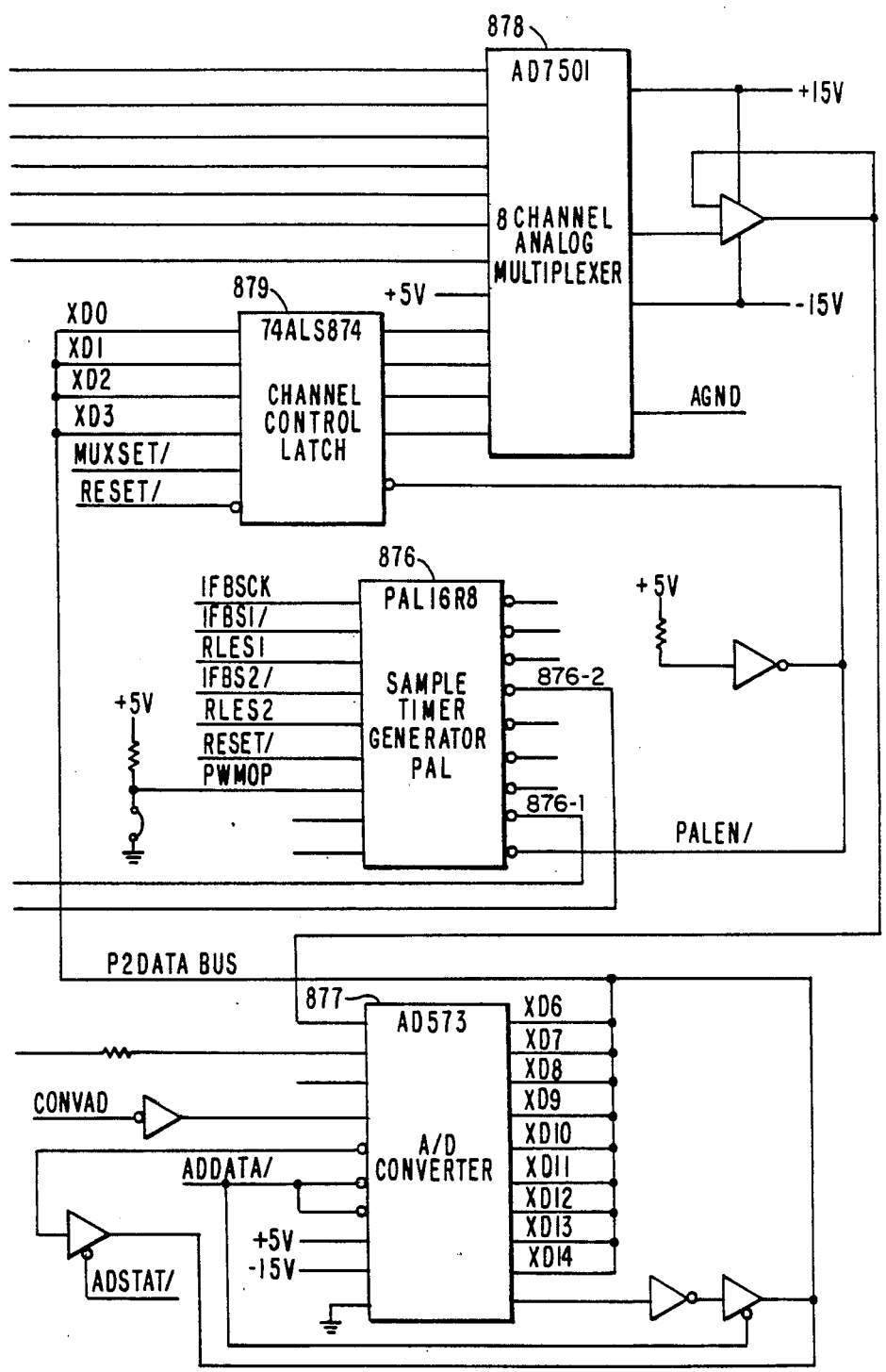

Feedback circuitry used to process the motor current feedback signals from the respective power amplifier feedback resistors (such as the one 63 shown in FIG. 11B) for the six joints is shown in FIGS. 12A–12C. The current feedback circuitry includes six respective feedback channels 873-1 through 873-6. Each feedback channel includes a differential operational amplifier 874 having its output coupled to a sample and hold circuit 875 in FIG. 12B. A PAL device 876 in FIG. 12C generates sample time signals 876-1 and 876-2 under PWM synchronizing control IFBSCK. The sample/hold feedback signals from all of the joints are coupled to an analog-to-digital converter 877 through a multiplexer 878 under the control of a channel control latch 879. A digital representation of motor current feedback is coupled to the P2 data bus for use by the digital torque loop control in the processor board 600.

The voltage drop across the current sensing resistor 59 in FIG. 5 is sampled or strobed by the control system to produce a feedback current reading once each PWM cycle at the zero positive point 848-1 in FIG. 4 of the PWM ramp, i.e., at the midpoint of the lower end stop. As such, the feedback current sample represents the average current flowing through the motor during the associated PWM cycle under all operating conditions.

PROOF THAT CURRENT SAMPLE IS AVERAGE VALUE

Figure 11D:
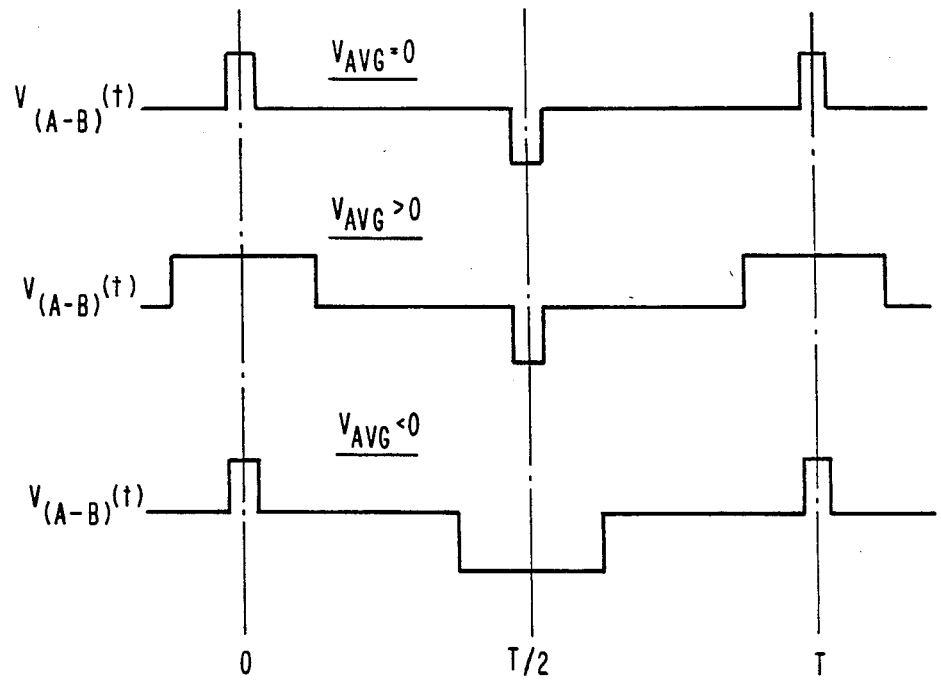

The current sampling technique always measures the average value of current flowing through the motor. The configuration shown in FIG. 11C exists. Switches S1, S2, S3, S4 are controlled to yield the voltage shown in FIG. 11D applied from point A to point B.

T is the period of pulse width modulation (PWM).

Applied voltage $V_{(A-B)}$ is always modulated symmetrically about time t=0 for positive applied voltage and modulated symmetrically about t=T/2 for negative applied voltages.

Current sampling is always done at t=0 (or an integer multiple of T.

$$V_{(A-B)}(t) = i(t) \cdot Z_m + EMF_{motor} \quad Z_m = R_m + j\omega L_m$$

or $$V_{(A-B)}(t) - EMF_{motor} = i(t) \cdot Z_m \quad \begin{array}{l} EMF_{motor} \text{ has} \\ \text{only a DC} \\ \text{component} \end{array}$$
$$V(t)$$

V(t) can be expressed a summation of fourier components in following manner:

$$V(t) = \frac{a_o}{2} + \sum_{n=1}^{\infty} a_n \cos n \, \omega_o t + \sum_{n=1}^{\infty} b_n \sin n \, \omega_o t$$

where $\omega_o = 2\pi/T$, n is any integer 1 to $\infty$, and $a_o/2$ is equal to the average value of V(t).

Since V(t) is an even valued function (i.e. V(t)=V(-t)), it can be shown that all values of $b_n$ are equal to zero and the value of each $a_n$ is given by $$a_n = \frac{4}{T} \int_0^{T/2} V(t) \cos n \, \omega_o t \, dt$$

thus, we have $$V(t) = \frac{a_o}{2} + \sum_{n=1}^{\infty} a_n \cos n \, \omega_o t \, dt = i(t) \cdot Z_m.$$

The rules of superposition apply to this function so we can express the $i(t) \cdot Z_m$ as a summation of terms where each component can be equated to the corresponding frequency component given for V(t).

$$\therefore i(t) \cdot Z_m = I_{AVG} \cdot Z_m(d.c.) + \sum_{n=1}^{\infty} i(n\omega_o t) \cdot Z_m(n\omega_o t)$$

where $I_{AVG}$ is average current flow in the motor, $Z_m$(d.c.) is motor impedance at zero frequency, $i(n\omega_o t)$ and $Z_m(n\omega_o t)$ are current and impedance components at respective integer multiples of $n\omega_o$.

Now $Z_m = R_m + j\omega L_m$ at any value of $\omega$ and we can write i(t) as a summation of individual frequency components expressed by:

$$i(t) = \frac{V(t)}{Z_m(t)} = \underbrace{\frac{a_o}{Z(R_m + j \cdot O \cdot L)}}_{I_{AVG}} + \sum_{n=1}^{\infty} \frac{a_n \cos n \, \omega_o t}{Z_m(n\omega_o t)}$$

Examining $Z_m(n\omega_o t)$ we have $Z_m = R_m + j \, n \, \omega_o L_m$ where $\omega_o L_m >> R_m$ for all values of n>0.

Therefore, we can write $$Z_m(n\omega_o t) = j \, n \, \omega_o L_m \text{ and}$$

$$\sum_{n=1}^{\infty} \frac{a_n \cos n \, \omega_o t}{Z_m(n\omega_o t)} = \sum_{n=1}^{\infty} \frac{a_n \cos n \, \omega_o t}{j n \omega_o L_m)}$$

which is equivalent to $$\sum_{n=1}^{\infty} \frac{a_n \sin n \, \omega_o t}{n\omega_o m}$$

Now current samples are always taken at times when t is equal to $$xT = x \frac{2\pi}{\omega_o}$$

(x=0,1,2,3, --$\infty$) and the instantaneous value of sin n $\omega_o t = \sin n \, 2\pi x = 0$ for all integer values of n and x. $\therefore$ At the sampling point $\epsilon(t)^2$ $I_{AVG}+0$ which is what we want.

Figure 6:
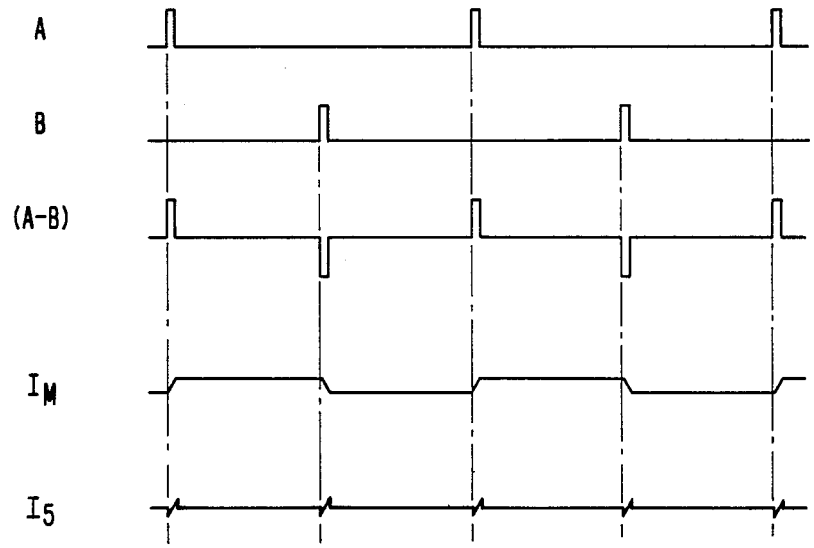
FIGS. 6-10 show respective sets of current and voltage waveforms for the bridge circuit in various operating cases.

For a zero motor voltage command (or a zero current requirement), the average motor current over the PWM cycle is zero because the end stop motor pulses are equal and opposite. FIG. 6 depicts this standstill case. The symbols in FIG. 6 (and FIGS. 7-10) have reference to the symbols shown in the FIG. 5 diagram).

A and B represent the potentials at circuit points A and B and the quantity A-B represents the voltage across the motor as a function of time. The motor voltage pulses result from the end stop control pulses TES, TEG and LES, LEG and average to zero.

The motor current caused by the voltage pulses is designated by $I_m$. The sensing resistor current is designated by $I_s$ and it is strobed at the midpoint of the end stop pulse—where the sensing resistor current is zero corresponding to the average value of the motor current $I_m$ over the PWM cycle which is also zero.

In FIGS. 7-10, various additional operating conditions are shown and in these figures currents I1 through I4 are graphed to show the flow of freewheeling currents during time periods when motor drive current is turned off. Freewheeling portions of the various current waveforms are designated by the letters FW. Motor drive portions of the current waveforms are designated by the letters MD.

Figure 7:
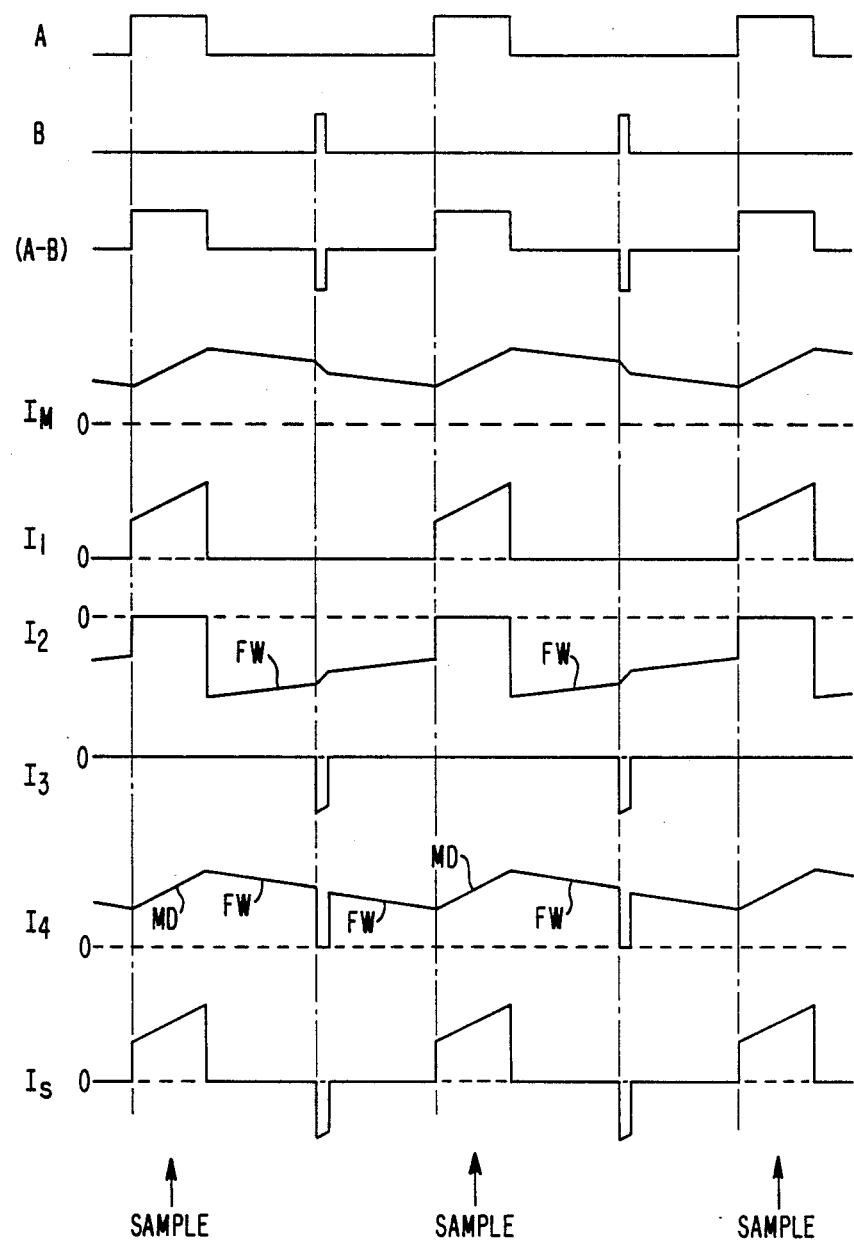
Figure 8:
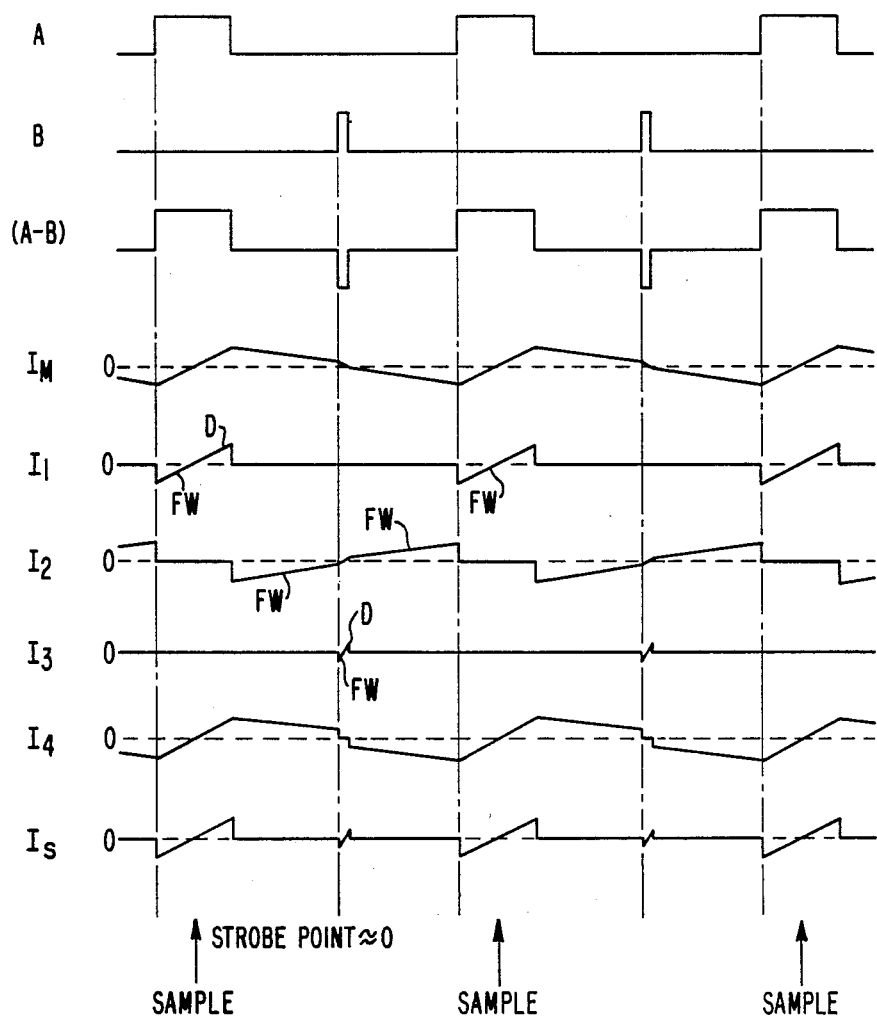
Figure 9:
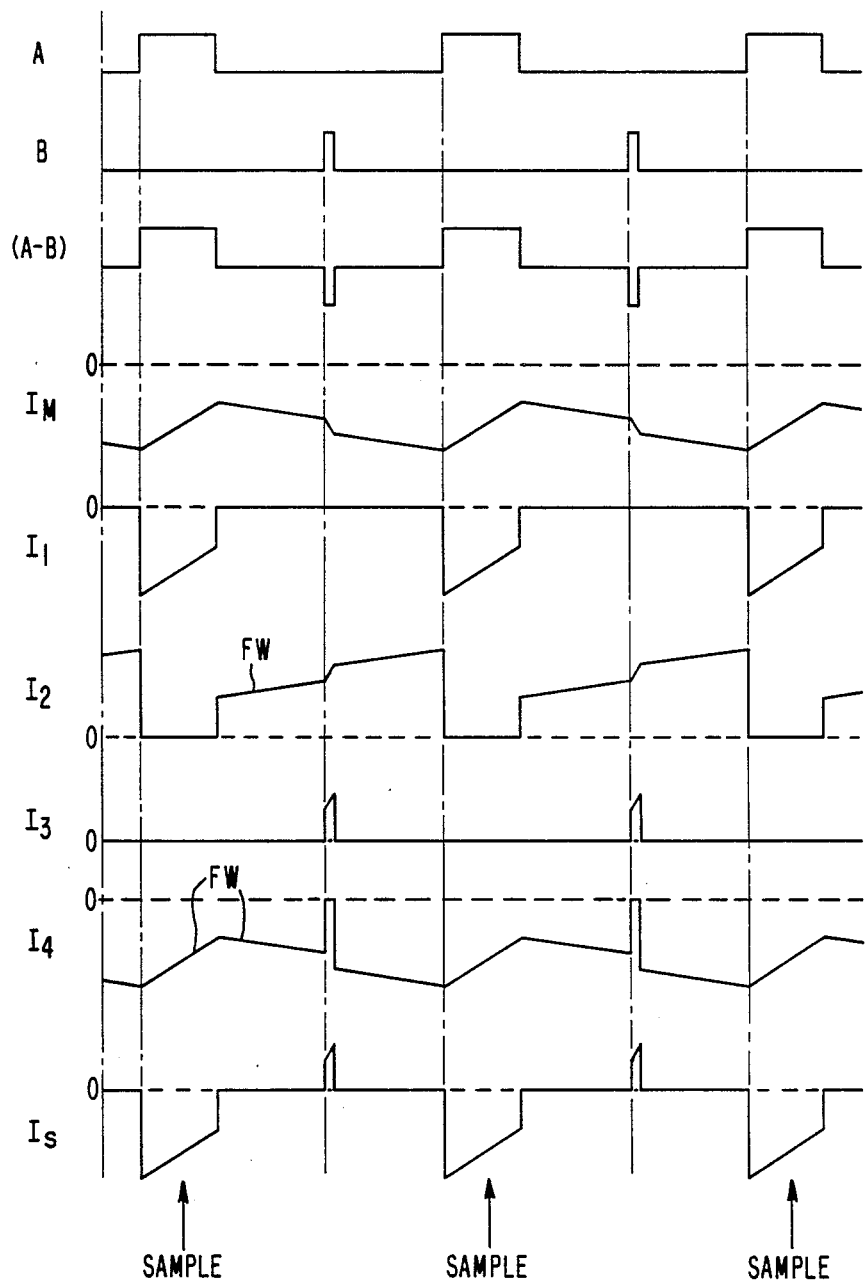
Figure 10:
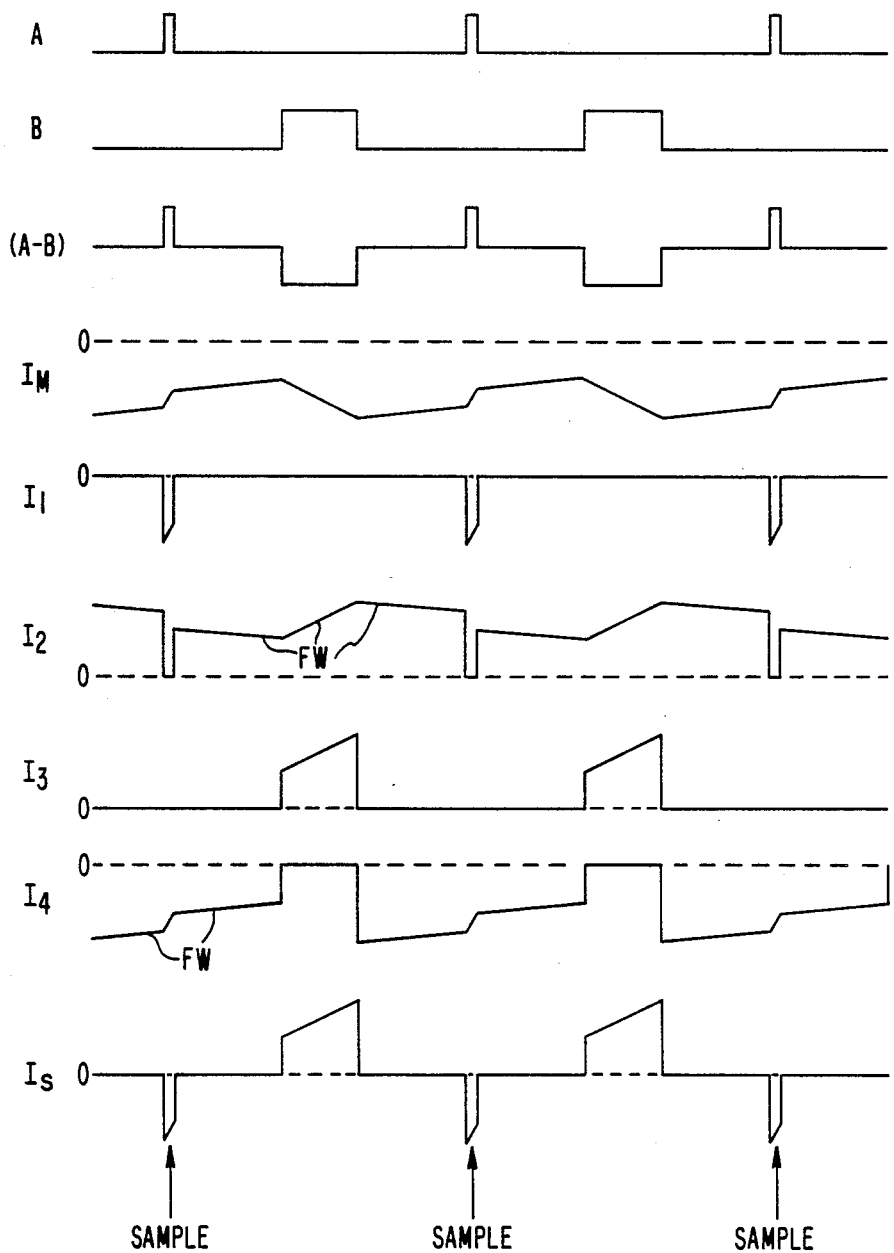

FIG. 7 pertains to the case of acceleration and FIG. 8 relates to the case of steady state rotation. FIG. 9 relates to the case of a speed drop while FIG. 10 depicts the case of braking, i.e., the application of an opposite polarity voltage to the motor. In all these cases, the feedback current sampling occurs at the end stop pulse midpoint as shown and represents the average value of the motor current $I_m$ during the associated PWM cycle.

In FIGS. 11A-11B, there is shown a three phase power amplifier employed in another embodiment of the invention for brushless DC motors. Generally, a single resistor can be employed with any power amplifier bridge circuit and provide sampled current feedback signals which represent the average motor current in the PWM cycle regardless of the number of legs in the bridge circuit.

POWER AMPLIFIER FOR BRUSHLESS DC MOTORS

A commercially available, low cost hybrid power amplifier block 60 (FIG. 11B) is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching cirucuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation.

The power amplifier block 60 additionally includes external terminals 64-1, 64-2 and 64-3 for respective connection to the free ends 65-1, 65-2 and 65-3 of the Y connected motor windings. External terminals 66-1 through 66-6 are also provided for application of the switch control signals U1 and U2, V1 and V2 and W1 and W2 from the PWM commutation circuitry. To prevent power supply shorting and switch burnout, the power switches are always controlled so that only one switch can be on at a time in each of the respective pairs of switches 61-1 and 61-2 61-4, 61-3 and 61-4, and 61-5 and 61-6.

The control signals U1, V1 and W1 are the basic pulse width control signals that control the level of drive current through the motor windings. The control signals U2, V2 and W2 enable the six motor winding conduction paths in rotation and generally provide for the flow of freewheeling motor currents.

The following listing along with FIGS. 11A and 11B provides a more complete understanding of the rotating (commutated) motor conduction paths and how the power switches operate to rotate the motor conduction paths and produce the rotating rotor gap magnetic flux which drives the rotor:

| Path | Switches Turned On | Windings Serially Connected |
|---|---|---|
| 1 | U1-V2 | U-V |
| 2 | U1-W2 | U-W |
| 3 | V1-W2 | V-W |
| 4 | V1-U2 | V-U |
| 5 | W1-U2 | W-U |
| 6 | W1-V2 | W-V |

POWER AMPLIFIER CONTROL SIGNALS

AIF board circuitry shown in FIGS. 13-A and 13-B for each of the six robot axes is used to generate the power amplifier control signals U1 through W2 from the PWM signals A1, A2, B1 and B2 and couple the same to the power amplifier output terminals on the AIF board 800.

Separate drive circuit channels shown in FIGS. 13A, 13B and 13C, 13D are provided on the AIF board 800 to process and couple the PWM digital outputs to the power amplifiers for the respective robot joint motors. Since the drive circuit channels are alike, only one channel 860J1 will be described.

At the input of the drive circuit for this channel four PWM digital drive pulses AP1A1-A-2 and AP1B1-B2 are applied to a PAL device 861-1. As previously described, the A and B pulses are time shifted, the A2 and B2 pulses are relatively wide enable pulses and the A1 and B1 pulses have varying time width to function as control pulses (within the B2 and A2 time spans, respectively).

In addition, three similarly prefixed feedback commutation signals AP1 C-CAL-CDL-CCL from the joint 1 brushless DC motor are applied to the PAL device 861-1. As shown in figure, three Hall effect sensors 864-1, 865-1, 866-1 are disposed about the periphery of the joint 1 motor to respond to magnetic flux changes and indicate the position of the rotor and which way the rotor is moving. Like sensors are employed for each joint motor as shown. Each sensor signal is routed to a comparator 867 which operates a gate 868 when the sensor signal reaches a reference level.

Figure 13A:
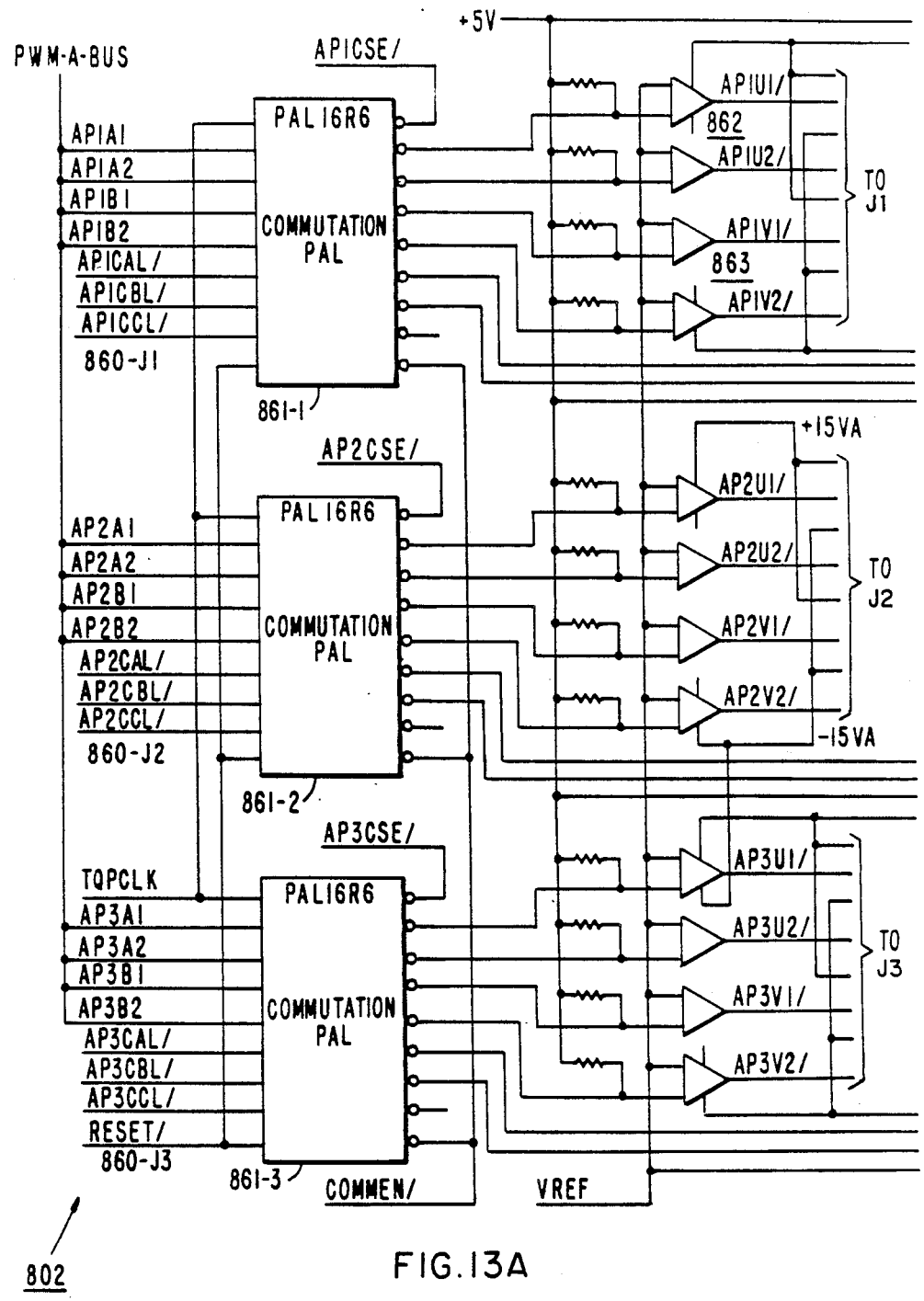
FIGS. 13A-F illustrate commutation circuit operation in a brushless DC motor embodiment of the invention.
Figure 13B:
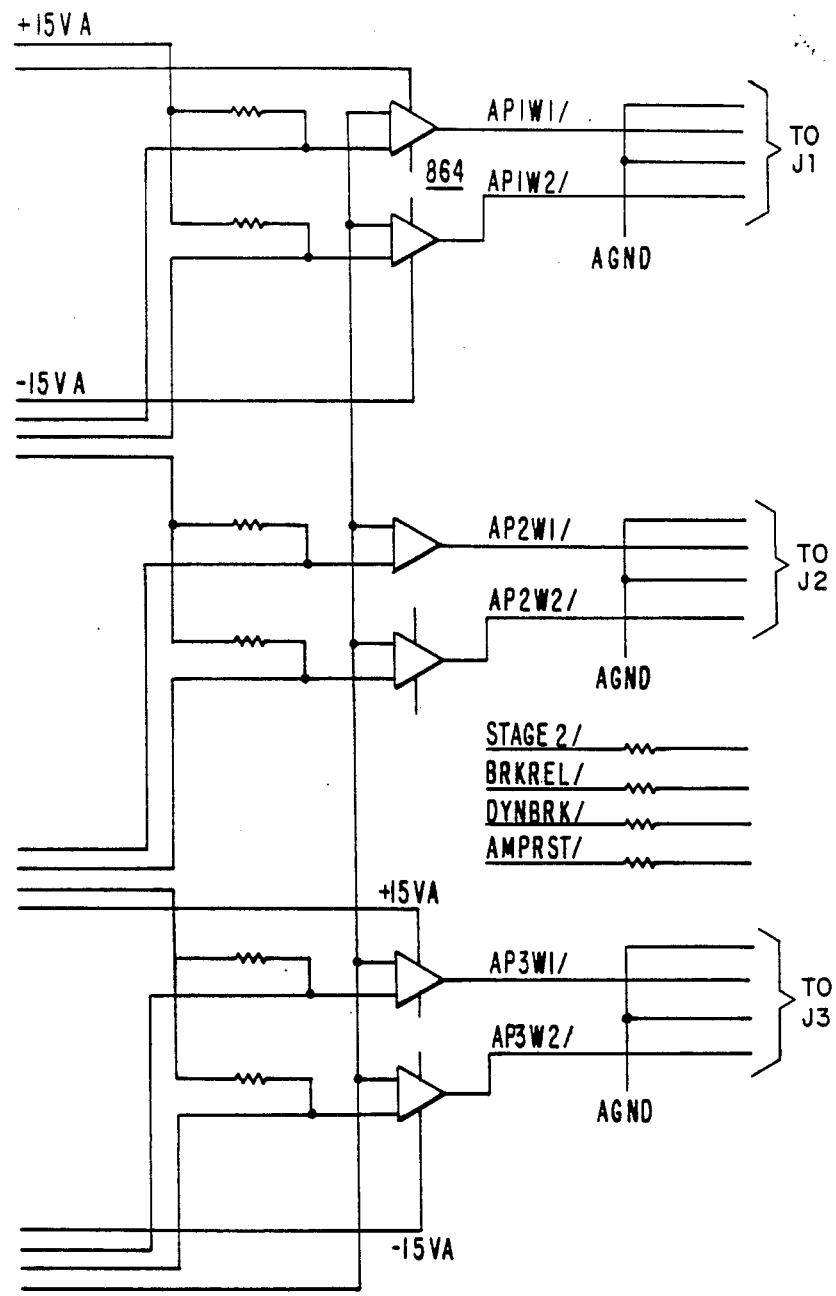
Figure 13C:
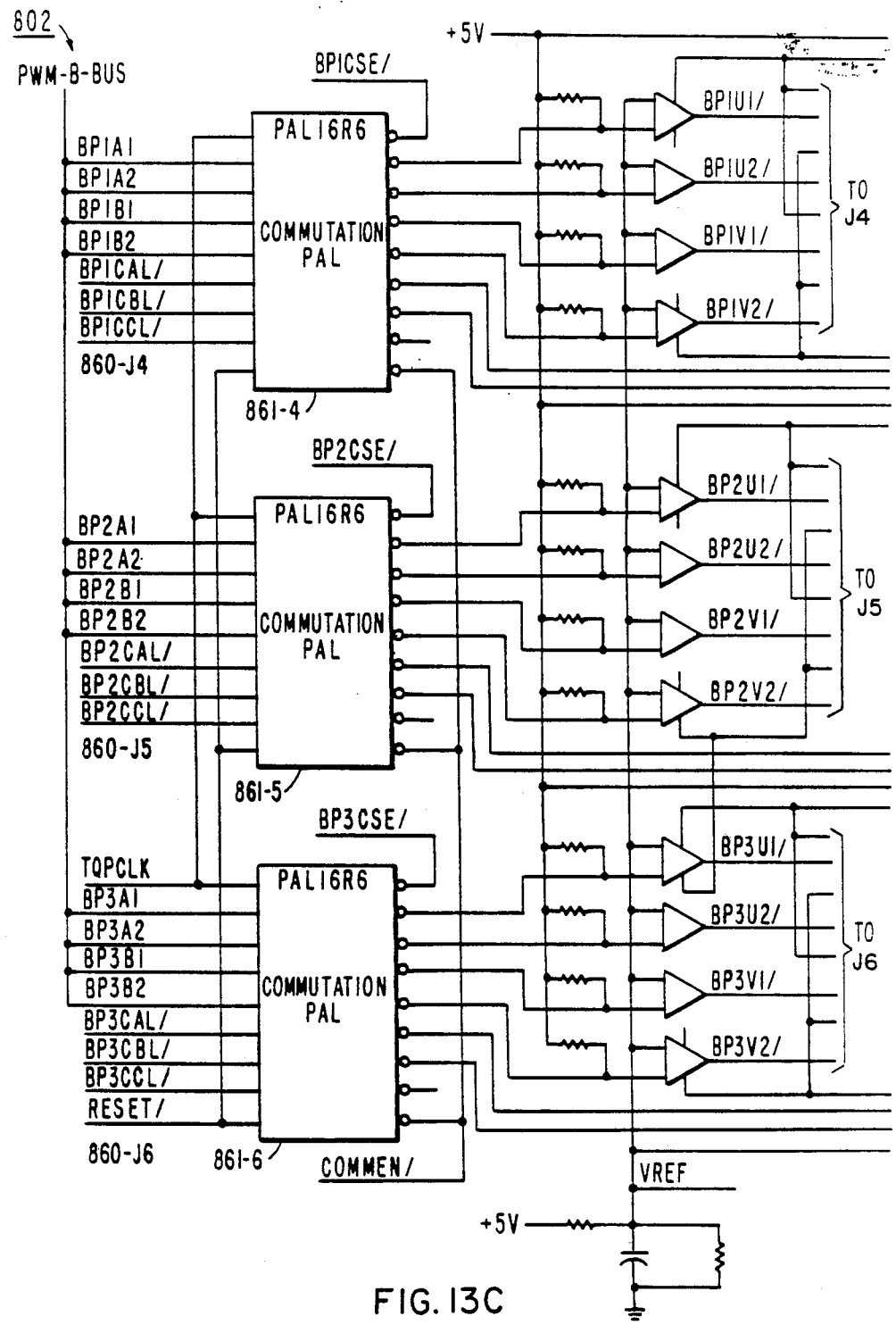
Figure 13D:
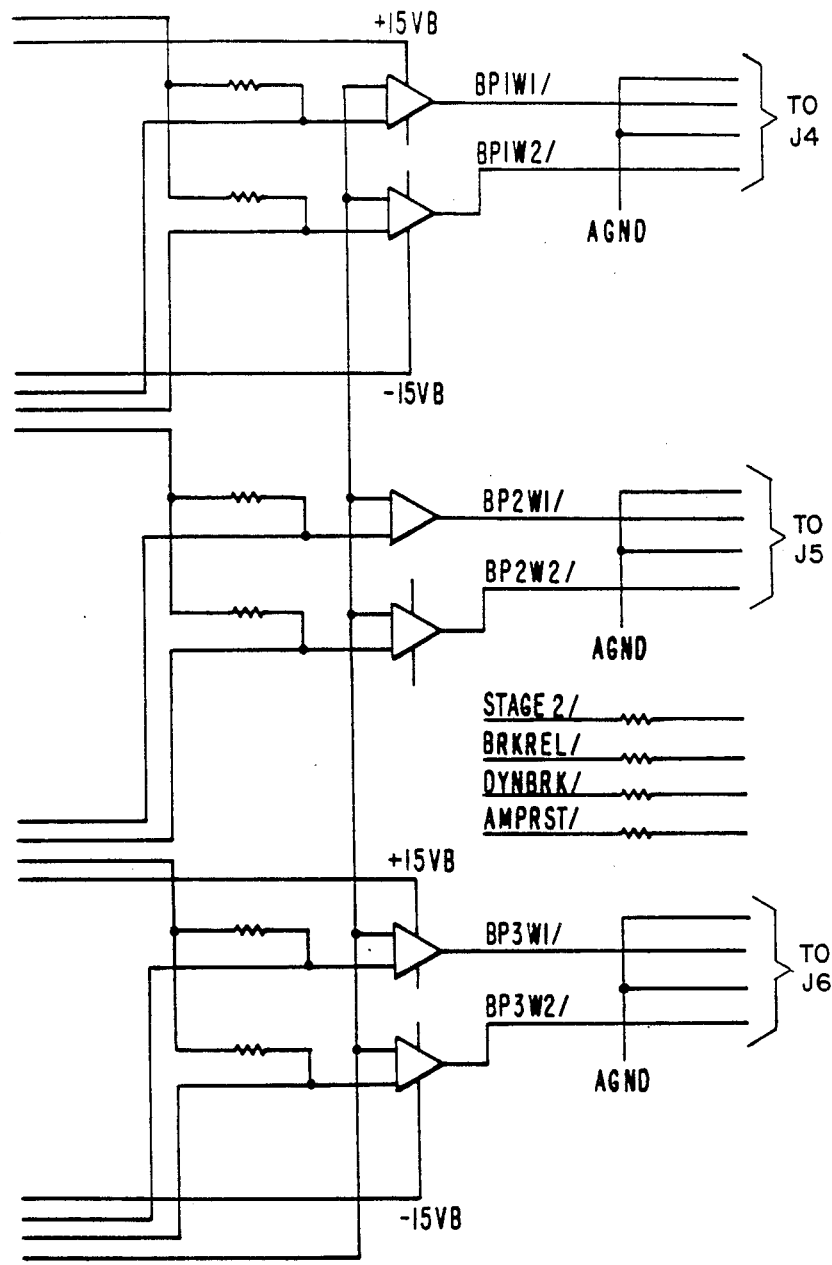
Figure 13E:
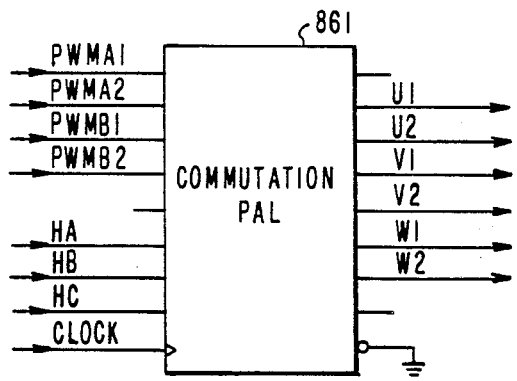
Figure 13F:
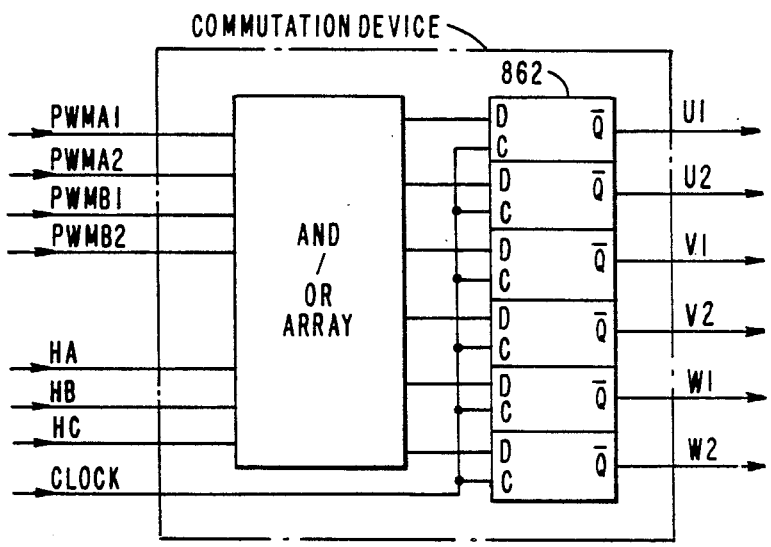

The nine gate output signals from the nine comparator circuit channels which process the Hall effect sensor signals from joint motors 1, 2 and 3 are applied to a two component latch register 869 in FIG. 13F-2 of incorporated, incorporated-by-reference U.S. Pat. No. 4,786,847 (Ser. No. 932,989) which in turn generates commutation signals for the commutation PALS 861-1, 861-2, 861-3. A latch register 870 in FIG. 13G-2 of W.E. 53,373 similarly generates commutation signals that are applied to the PALS 861-4, 861-5, 861-6 for joint motors 4, 5 and 6. Respective buffers 871 and 872 access the commutation signals to the P2 data bus for the torque processor board 600 thereby providing a basis for modification of PWM output signals as a function of motor rotor position. These signals can also be used as the basis for providing software commutation in an alternative arrangement for control of the three motor windings.

Thus, the PAL device 861-1 logically operates analog driver circuits 862, 863 and 864 in FIGS. 13A and 13B to generate commutation timed signal sets AP1U1-U2, AP1V1-V2 and AP1W1-W2 for application to the power amplifier switches shown in FIG. 11B which in turn direct motor drive current pulses through the joint 1 motor windings in accordance with the commutation control and in accordance with the pulse width modulation control. The currents through the windings of the other joint motors are similarly controlled by the other PAL devices 861-2 through 861-6.

A simplified schematic of the commutator PAL devices 861-1 through 861-6 is shown in FIG. 13E as a commutator PAL device 861 with input signals A1, A2, B1 and B2 from the PWM and HA, HB and HC from the Hall sensors and output signals U1 through W2 to the power amplifier. The PAL device is a commercially available programmable array logic device which is programmed with the following logic equations to generate the designated outputs from the applied inputs:

$$+B1 \cdot HA \cdot HB + B1 \cdot \overline{HB} \cdot HB$$

$$+B2 \cdot HA \cdot HB + B2 \cdot \overline{HB} \cdot HB$$

$$V1 = A1 \cdot HB \cdot \overline{HC} + B1 \cdot \overline{HB} \cdot HC$$

$$V2 = A2 \cdot HB \cdot \overline{HC} + B2 \cdot \overline{HB} \cdot HC$$

$$W1 = A1 \cdot HC \cdot \overline{HA} + B1 \cdot \overline{HC} \cdot HA$$

$$W2 = A2 \cdot HC \cdot \overline{HA} + B2 \cdot \overline{HC} \cdot HA$$

As shown in FIG. 13F, the power amplifier control pulses U1 through W2 are logically controlled by block 862 to be synchronized with the clock pulses C.

The waveforms shown in FIG. 10 of incorporated by reference Ser. No. 932,974 now continuation Ser. No. 178,813 show more clearly the manner in which the various pulses are related. At the top of the grap, the Hall effect rotor position signals are observed to be overlapping pulses which are phase shifted by 60 electrical degrees.

The A1 and B2 pulses are being generated to produce motor drive current in the forward direction. Thus, the B2 pulse is a wider enabling pulse that embraces the A1 pulse but is off during the on time of the B1 pulse. The width of the A1 pulse provides control over the switch on time in the power amplifier.

The A2 pulse is a wider enabling pulse for the B1 pulse which in this instance is a narrow end stop control pulse explained more fully elsewhere herein. Generally, both the A1 and B1 pulses are implemented to force current conduction through the connected motor winding at both ends of the PWM ramp even if the control command is not otherwise calling for drive current.

The PAL generated power amplifier drive signals U1 through W2 are shown at the bottom of the graph in FIG. 10 of incorporated by reference Ser. No. 932,974 now continuation Ser. No. 178,813. The successive winding connection states (or motor conduction paths) 1 through 6 are designated between the vertical dotted time lines.

What is claimed is:

1. A system for energizing a robot arm joint motor and for sensing motor current for feedback control, said system comprising:

a power amplifier including a bridge circuit with a plurality of legs each having one end thereof connected to supply drive current to the motor from a power supply connected across said bridge circuit to the other ends of said legs;

a semiconductor switch having a control terminal, one said switch connected in each bridge leg with a control signal being applied to the control terminal to make that bridge leg switchably conductive;

digital control means for cyclically generating switch control signals that are pulse width modulated to operate said power switches and produce motor drive current having direction and magnitude required by cyclically generated robot drive control commands;

said digital control means generating said switch control signals to make each motor supply current path through said bridge circuit conductive over at least a short portion of each control cycle, according to forced switching patterns, the direction and amplitude of the current through the motor being adapted to be sampled with a single sense resistor, independent of the number of legs in the power bridge;

means for cyclically sampling the current from the power supply to said bridge circuit via the single sense resistor, at a predetermined time interval during the forced patterns of semiconductor switch conduction in each controlled cycle of the motor supply path and in synchronism with the digital control means cycle and within said short cycle portion, so that the sampled current is forced to flow through the single sense resistor at a time when it accurately indicates the magnitude and polarity of average current flowing in the motor; and said sampling means further coupling signals representing the current samples to said digital control means to provide feedback control over the generation of said robot drive control commands.

2. A system for energizing a robot arm joint motor and for sensing motor current for feedback control, said system comprising:

a power amplifier including a bridge circuit with a plurality of legs each having one end thereof connected to supply drive current to the motor from a power supply connected across said bridge circuit to the other ends of said legs forming a terminal junction;

a semiconductor switch having a control terminal, one said switch being connected in each bridge leg with a control signal to make that leg conductive when the control signal is applied to said switch control terminal;

central resistance means serially connected between said bridge circuit and the power supply at the external junction of the plurality of legs in the plural leg bridge circuit;

digital control means for cyclically generating switch control signals that are pulse width modulated to operate said power switches and produce motor drive current having direction and magnitude required by cyclically generated robot drive control commands;

said digital control means generating forced patterns of said switch control signals to make each motor supply current path through said bridge circuit conductive over at least a short portion of each control cycle;

means for cyclically sampling the direction and magnitude of the current through said central resistance means, at a predetermined time interval during the forced patterns of semiconductor switch conduction in each controlled cycle of the motor supply path and in synchronism with the digital control means cycle and within said short cycle portion, the direction and magnitude of the current through the motor being adapted to be accurately indicated by the current through said central resistance; and said sampling means coupling signals representing the current samples to said digital control means to provide feedback control over the generation of said robot drive control commands.

3. A system as set forth in claim 2 wherein:

the motor is a brush type DC motor;

said bridge circuit in an H type bridge having four legs with a cross path in which the motor is connected;

one of said switches is connected in each bridge leg with an upper leg and the opposite lower leg forming a forward path to drive the motor in the forward direction and with the other opposite upper and lower legs forming a reverse path to drive the motor in the reverse direction;

one of said switches in each motor path has a control signal applied thereto to control the drive current conduction time; and the other of said switches in each motor path has a control signal applied thereto to make it nonconductive when the one drive current controlling switch on its side of the H bridge is conductive and during underlap time and to make it conductive for the rest of the time in each cycle so as to provide paths for freewheeling motor currents.

4. A system as set forth in claim 2 wherein:

the motor is a brushless DC motor using the central resistance means for sensing the average motor current therein.

5. A system as set forth in claim 1 wherein:

said digital control means includes velocity and position control loop means generating a motor drive current command;

said digital control means further includes torque control loop means responding to said motor drive current command and said motor current sample signals to generate voltage commands;

pulse width modulator means for generating, said power switch control signals from said voltage commands;

said current feedback signals being coupled to said torque control loop.

6. A robot having:

an arm with a plurality of joints;

each of said joints having an electric drive motor associated therewith;

each of said motors coupled to a power amplifier including a bridge circuit with a plurality of legs each having one end thereof connected to supply drive current to the motor from a power supply connected across said bridge circuit to the other ends of said legs;

a semiconductor switch having a control terminal, one said switch being connected in each bridge leg to make that leg to be conductive when a control signal is applied to said switch control terminal;

resistance means adapted for central sampling, serially connected between said bridge circuit and the power supply, independent of the number of legs in the plural leg bridge circuit;

digital control means for cyclically generating patterns of switch control signals that are pulse width modulated to operate said power switches and produce motor drive current having direction and magnitude required by cyclically generated robot drive control commands;

means for cyclically sampling the current through said resistance means at a predetermined time interval, during the patterns of semiconductor switch conduction in each controlled cycle of the motor supply path, in synchronism with the digital control means cycle and within said short cycle portion;

said digital control means generating the patterns of said switch control signals to force each motor supply path through said bridge circuit to be conductive over at least a short portion of each control cycle, the direction of the current through the motor adapted to be sampled, the sampled current through the resistance means flowing therethrough, at a time when it accurately indicates the polarity and average of the current flowing in the motor;

said sampling means coupling signals representing the current samples to said digital control means to provide feedback control over the generation of said robot drive control commands;

one of said power amplifiers with its resistance means and current sample coupling means being provided for each joint motor; and said digital control means generating switch control signals for switches in each of said power amplifiers.

7. A system as set forth in claim 3 wherein:

said bridge circuit is enclosed in a power block;

said power block is provided with external power terminals for connection to the power supply and external terminals for coupling of the switch control signals to said power switch control terminals; and said resistance means is connected between one of said external power terminals of said power block and one output end of the power supply.

8. A system as set forth in claim 4 wherein:

said bridge circuit is enclosed in a power block;

said power block is provided with external power terminals for connection to the power supply and external terminals for coupling of the switch control signals to said power switch control terminals; and said resistance means is connected between one of said power terminals and one input end of the power supply.

9. A system as set forth in claim 7 wherein:

the voltage drop across said resistance means is coupled to said digital control means to represent the current samplings.

10. A system as set forth in claim 8 wherein:

the voltage drop across said resistance means is coupled to said digital control means to represent the current samplings.

11. A system as set forth in claim 1 wherein:

said digital control means generates an up/down counter ramp as a function of time;

said digital control means further generates said switch control signals to force motor path conduction in one direction during a short control cycle portion about one end of the ramp and in the opposite direction during a short control cycle portion about the other end of the ramp; and said cyclical means samples the resistance means current at the midpoint of the forced conduction time periods.

12. A system as set forth in claim 1 wherein the motor is a DC brush type and the bridge circuit is an H-bridge type enclosed in a power block.

13. A system as set forth in claim 1 wherein the motor is a brushless DC type and the bridge circuit is internally configured and enclosed in a power block to energize three motor phase windings in rotating pairs.

* * * * *